(12) United States Patent
Pham Van et al.

(10) Patent No.: US 11,399,199 B2
(45) Date of Patent: Jul. 26, 2022

(54) CHROMA INTRA PREDICTION UNITS FOR VIDEO CODING

(71) Applicant: QUALCOMM Incorporated, San Diego, CA (US)

(72) Inventors: Luong Pham Van, San Diego, CA (US); Han Huang, San Diego, CA (US); Geert Van der Auwera, Del Mar, CA (US); Adarsh Krishnan Ramasubramonian, Irvine, CA (US); Cheng-Teh Hsieh, Del Mar, CA (US); Wei-Jung Chien, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/947,489

(22) Filed: Aug. 4, 2020

(65) Prior Publication Data

US 2021/0044828 A1    Feb. 11, 2021

Related U.S. Application Data

(60) Provisional application No. 62/882,995, filed on Aug. 5, 2019, provisional application No. 62/885,069, filed
(Continued)

(51) Int. Cl.
*H04N 19/593* (2014.01)
*H04N 19/176* (2014.01)
*H04N 19/186* (2014.01)
*H04N 19/96* (2014.01)
*H04N 19/159* (2014.01)

(52) U.S. Cl.
CPC ......... *H04N 19/593* (2014.11); *H04N 19/159* (2014.11); *H04N 19/176* (2014.11); *H04N 19/186* (2014.11); *H04N 19/96* (2014.11)

(58) Field of Classification Search
None
See application file for complete search history.

(56) References Cited

U.S. PATENT DOCUMENTS 8,369,404 B2 * 2/2013 Sekiguchi ............ H04N 19/82
375/240.14
10,785,486 B2 * 9/2020 Li ..................... H04N 19/176
(Continued)

OTHER PUBLICATIONS

International Search Report and Written Opinion—PCT/US2020/070371—ISA/EPO—dated Oct. 21, 2020 14 Pages.
(Continued)

*Primary Examiner* — Patricia I Young
(74) *Attorney, Agent, or Firm* — Shumaker & Sieffert, P.A.

(57) ABSTRACT

A video decoder can be configured to determine that a block of the video data is formatted in accordance with a 4:4:4 video coding format; determine that the block of the video data is encoded in an intra prediction mode; determine that a smallest chroma intra prediction unit (SCIPU) is disabled for the block in response to determining that the block has the 4:4:4 video coding format; decode the block of the video data based on the determination that the SCIPU is disabled; and output decoded video data comprising a decoded version of the block.

42 Claims, 20 Drawing Sheets

Related U.S. Application Data on Aug. 9, 2019, provisional application No. 62/889,378, filed on Aug. 20, 2019, provisional application No. 62/902,188, filed on Sep. 18, 2019.

(56) References Cited

U.S. PATENT DOCUMENTS

| | | | | |
|---|---|---|---|---|
| 2008/0170615 | A1* | 7/2008 | Sekiguchi | H04N 19/70 375/240.14 |
| 2009/0003441 | A1* | 1/2009 | Sekiguchi | H04N 19/147 375/240.13 |
| 2017/0099490 | A1* | 4/2017 | Seregin | H04N 19/176 |
| 2017/0244975 | A1* | 8/2017 | Huang | H04N 19/186 |
| 2018/0077426 | A1* | 3/2018 | Zhang | H04N 19/117 |

OTHER PUBLICATIONS

ITU-T H.265, Series H: Audiovisual and Multimedia Systems, Infastructure of Audiovisual Services—Coding of Moving Video, High Efficiency Video Coding, The International Telecommunication Union, Jun. 2019, 696 Pages.
Jang (Lge) H et al., "NonCE: To Support SCIPU with Local Dual Tree for Various Color Format," 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P0575, Sep. 25, 2019, (Sep. 25, 2019), XP030217755, 4 pages, Retrieved from the Internet: URL: http://phenix.int-evry.fr/jvet/doc_end_user/documents/16_Geneva/wg11/JVET-P0575-v1.zip. JVET-P0575.docx. [retrieved on Sep. 25, 2019].
Lin Z.Y., et al., "CE3-related: Constrained Partitioning of Chroma Intra CBs," 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0082, Mar. 13, 2019 (Mar. 13, 2019), XP030202807, 4 pages, Retrieved from the Internet: URL: http://phenix.int-evry.fr/jvet/doc_end_user/documents/14_Geneva/wg11/JVET-N0082-v1.zip JVET-N0082-v1.docx, [retrieved on Mar. 13, 2019].
Lin, Z-Y., et al., "CE3-2.1.1 and CE3-2.1.2: Removing 2×2, 2×4, and 4×2 Chroma CBs," JVET-O0050-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5, XP055738689. Retrieved from the Internet: URL: http://phenix.int-evry.fr/jvet/doc_end_user/documents/15_Gothenburg/wg11/JVET-O0050-v4.zip. JVET-O0050 Spec CE3-2.1.2.docx. [retrieved on Jul. 10, 2019].
Sullivan G.J., et al., "Overview of the High Efficiency Video Coding (HEVC) Standard," IEEE Transactions On Circuits And Systems For Video Technology, vol. 22, No. 12, Dec. 1, 2012 (Dec. 1, 2012), XP055388661, USA ISSN: 1051-8215, DOI: 10.1109/TCSVT.2012.2221191, pp. 1649-1668, p. 1662, Paragraph 3) Merge Mode.
Van L.P., et al., "Non-CE3: Combination of JVET-P0596 and JVET-P0531 on Removal of 2xN Chroma Intra Blocks," Joint Video Experts Team (JVET) of ITU-T SG 16 WP 3 and ISO/IEC JTC 1/SC 29/WG 11, JVET-P0641_v3, 16th Meeting: Geneva, CH, Oct. 1-11, 2019, 4 Pages.
Van P., (Qualcomm) L., et al., "Non-CE3: Generalization of SCIPU for Different YUV Formats," 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P0406, Oct. 2, 2019 (Oct. 2, 2019), XP030217214, 6 pages, Retrieved from the Internet: URL: http://phenix.int-evry.fr/jvet/doc_end_user/documents/16_Geneva/wg11/JVET-P0406-v3.zip. JVET-P0406 v3 Clean.docx. [retrieved on Oct. 2, 2019].
Wang Y-K. et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Yhchao: "Ticket #456: Issue of SCIPU in YUV444," Aug. 14, 2019 (Aug. 14, 2019), XP055738491, Retrieved from the Internet: URL: https://jvet.hhi.fraunhofer.de/trac/vvc/ticket/456 [retrieved on Oct. 9, 2020], 2 pages.
Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018].
Zhao Y., et al., "AHG16: Fix on Local Dual Tree," 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P0063, Sep. 25, 2019 (Sep. 25, 2019), XP030216102, 6 Pages, Retrieved from the Internet: URL: http://phenix.int-evry.fr/jvet/doc_end_user/documents/16_Geneva/wg11/JVET-P0063-v1.zip. JVET-P0063-v1.docx. [retrieved on Sep. 25, 2019].
Zhao Y., et al., "CE1-related: Constrained Chroma Block Partitioning," 12th JVET Meeting, Oct. 3, 2018-Oct. 12, 2018, Macao (The Joint Video Exploration Team of ISO/IEC JTC1/SC29/WG11 and ITU-T SG.16) No. JVET-L0372-v2, Sep. 30, 2018, XP030250371, pp. 1-3, retrieved from the internet: URL:http://phenix.int-evry.fr/jvet/doc_end_user/documents/12_Macao/wg11/JVET-L0372-v2.zip JVET-LO372-v2_clean.docx [retrieved on Sep. 30, 2018].
Bossen F., et al., "JVET Common Test Conditions and Software Reference Configuralions for SDR Video," Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.
Chen J., et al., "Algorithm Description for Versatile Video Coding and Test Model 6 (VTM 6)," 15th Meeting, Joint Video Experts Team (JVET) of ITU-T SG 16 WP 3 and ISO/IEC JTC 1/SC 29/WG 11, JVET-O2002-v2, Gothenburg, SE, Jul. 3-12, 2019, pp. 1-89.
Deng, et al. "Non-CE3: Removal of 2xN chroma intra blocks," JVET-P0531, Joint Video Experts Team (JVET) of ITU-T SG 16 WP 3 and ISO/IEC JTC 1/SC 29/WG 11, 16th Meeting: Geneva, CH, Oct. 1-11, 2019, 4 pages.
Van, et al. "Non-CE3: Removal of chroma 2xN blocks in CUP mode," JVET-P0596-v2, Joint Video Experts Team (JVET) of ITU-T SG 16 WP 3 and ISO/IEC JTC 1/SC 29/WG 11, 16th Meeting: Geneva, CH, Oct. 1-11, 2019, 3 pages.
Bossen F., et al., "HM Software Manual," Joint Collaborative Team on Video Coding (JCT-VC) of ITU-T SG16 WP3 and ISO/IEC JTC1/SC29/WG11, JCTVC-Software Manual, Nov. 8, 2016, pp. 1-31.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "High Efficiency Video Coding (HEVC) Text Specification Draft 10 (for FDIS & Last Call)," 12th Meeting, Geneva, CH, Jan. 14-23, 2013, (Joint Collaborative Team on Video Coding of ISO/IEC JTC 1/SC 29/WG 11 and ITU-T SG 16 WP 3), JCTVC-L1003_v34, Mar. 19, 2013, 310 pages.
Bross B., et al., "Versatile Video Coding (Draft 10)," JVET-S2001-vG, Joint Video Experts Team (JVET) of ITU-T SG I6 WP 3 and ISO/IEC JTC 1/SC 29/WG 11, 19th Meeting: by Teleconference, Jun. 22-Jul. 1, 2020, 548 Pages.
Bross B., et al., "Versatile Video Coding (Draft 3)," Joint Video Experts Team (JVET) of ITU-T SG 16 WP 3 and ISO/IEC JTC 1/SC 29/WG 11, 12th Meeting: Macao, CN, JVET-L1001-V9, Oct. 3-12, 2018, 235 pp.
Bross B., et al., "Versatile Video Coding (Draft 6)," 127.MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-02001-vE, Jul. 15, 2019 (Jul. 15, 2019), XP030208562, 455 Pages.
Chao Y-H., et al., "CE4.2.3: STMVP Simplification," JVET-M0221, Joint Video Experts Team (JVET) of ITU-T SG 16 WP 3 and ISO/IEC JTC 1/SC 29/WG 11, 13th Meeting, Marrakech, MA, Jan. 9-18, 2019, 3 Pages.

(56) References Cited

OTHER PUBLICATIONS

Chen J., et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.
Chen J., et al., "Algorithm Description for Versatile Video Coding and Test Model 3 (VTM 3)," 12, JVET Meeting, Oct. 3, 2018-Oct. 12, 2018, Macao, (The Joint Video Exploration Team of ISO/IEC JTC1/SC29/WG11 and ITU-T SG.16), No. JVET-L1002-v1, Dec. 24, 2018 (Dec. 24, 2018), XP030200768, Retrieved from the Internet: URL: http://phenix.int-evry.fr/jvet/doc_end_user/documents/12_Macao/wg11/JVET-L1002-v2.zip JVET-L1002-v2.docx [retrieved on Dec. 24, 2018].
Chen J, et al., "Algorithm Description for Versatile Video Coding and Test Model 5 (VTM 5)," 126. MPEG Meeting, Mar. 19, 2019-Mar. 27, 2019, Geneva, (Motion Picture Expert Group or ISO/IEC JTC1/SC29/WG11), No. m48054, 14th Meeting, Joint Video Experts Team (JVET) of ITU-T SG 16 WP 3 andISO/IEC JTC 1/SC 29/WG 11, JVET-N1002-v2, Jun. 11, 2019 (Jun. 11, 2019), XP030212630, 76 pages.
Deng (Bytedance) Z., et al., "Non-CE3: Cleanups on Local Dual Tree for Non-4:2:0 Chroma Formats," 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P0537, Oct. 1, 2019 (Oct. 1, 2019), XP030217626, 4 Pages, Retrieved from the Internet: URL: http://phenix.int-evry.fr/jvet/doc_end_user/documents/16_Geneva/wg11/JVET-P0537-v2.zip. JVET-P0537r1.docx. [retrieved on Oct. 1, 2019].

* cited by examiner

| predModeIntra | -14 | -13 | -12 | -11 | -10 | -9 | -8 | -7 | -6 | -5 | -4 | -3 | -2 |
|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 |

| predModeIntra | -1 | 2 | 3 | 4 | 5 | 6 | 7 | 8 | 9 | 10 | 11 | 12 | 13 |
|---|---|---|---|---|---|---|---|---|---|---|---|---|---|
| intraPredAngle | 35 | 32 | 29 | 26 | 23 | 20 | 18 | 16 | 14 | 12 | 10 | 8 | 6 |

| predModeIntra | 14 | 15 | 16 | 17 | 18 | 19 | 20 | 21 | 22 | 23 | 24 | 25 | 26 |
|---|---|---|---|---|---|---|---|---|---|---|---|---|---|
| intraPredAngle | 4 | 3 | 2 | 1 | 0 | -1 | -2 | -3 | -4 | -6 | -8 | -10 | -12 |

| predModeIntra | 27 | 28 | 29 | 30 | 31 | 32 | 33 | 34 | 35 | 36 | 37 | 38 | 39 |
|---|---|---|---|---|---|---|---|---|---|---|---|---|---|
| intraPredAngle | -14 | -16 | -18 | -20 | -23 | -26 | -29 | -32 | -29 | -26 | -23 | -20 | -18 |

| predModeIntra | 40 | 41 | 42 | 43 | 44 | 45 | 46 | 47 | 48 | 49 | 50 | 51 | 52 |
|---|---|---|---|---|---|---|---|---|---|---|---|---|---|
| intraPredAngle | -16 | -14 | -12 | -10 | -8 | -6 | -4 | -3 | -2 | -1 | 0 | 1 | 2 |

| predModeIntra | 53 | 54 | 55 | 56 | 57 | 58 | 59 | 60 | 61 | 62 | 63 | 64 | 65 |
|---|---|---|---|---|---|---|---|---|---|---|---|---|---|
| intraPredAngle | 3 | 4 | 6 | 8 | 10 | 12 | 14 | 16 | 18 | 20 | 23 | 26 | 29 |

| predModeIntra | 66 | 67 | 68 | 69 | 70 | 71 | 72 | 73 | 74 | 75 | 76 | 77 | 78 | 79 | 80 |
|---|---|---|---|---|---|---|---|---|---|---|---|---|---|---|---|
| intraPredAngle | 32 | 35 | 39 | 45 | 51 | 57 | 64 | 73 | 86 | 102 | 128 | 171 | 256 | 341 | 512 |

FIG. 9

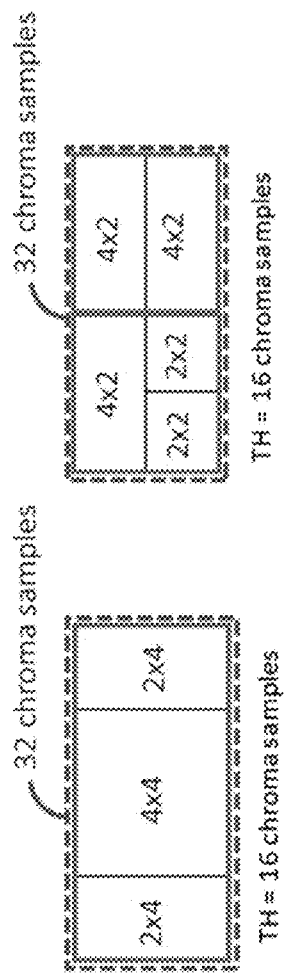
FIG. 11A
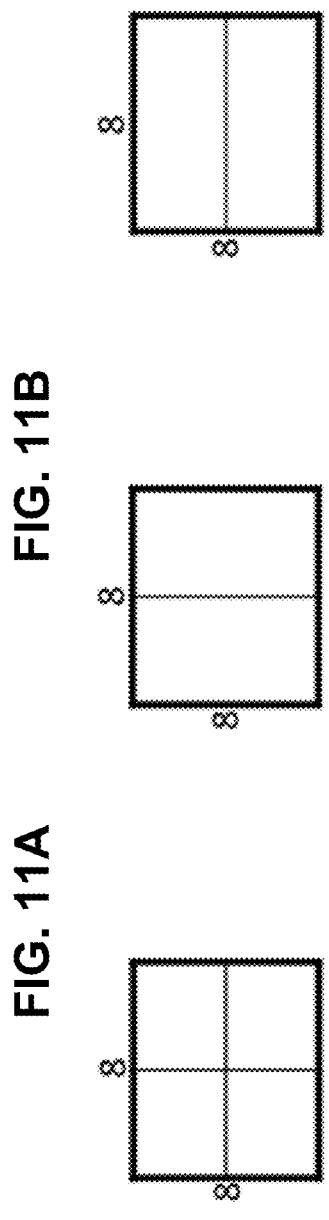
FIG. 11B
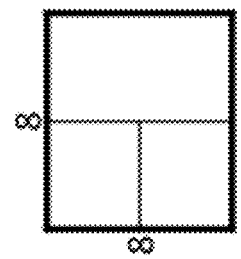
FIG. 12G
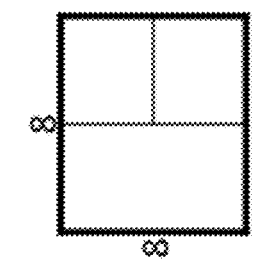
FIG. 12C
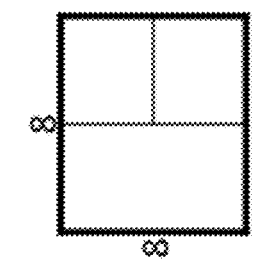
FIG. 12F
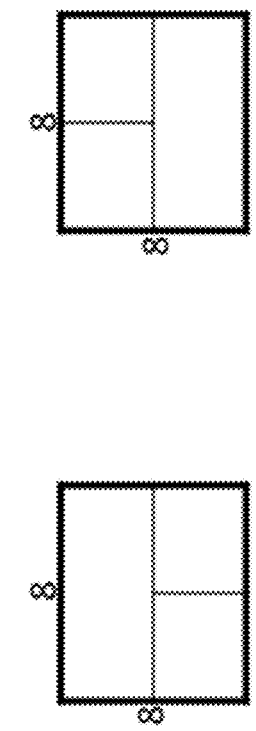
FIG. 12B
FIG. 12E
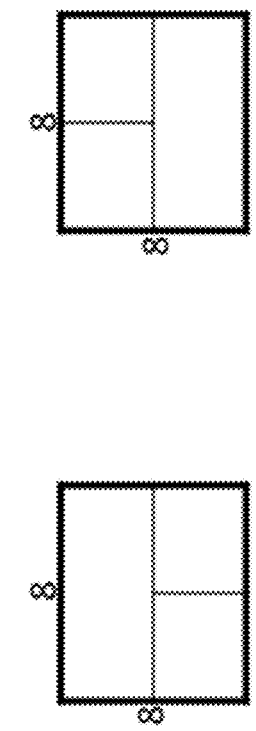
FIG. 12A
FIG. 12D

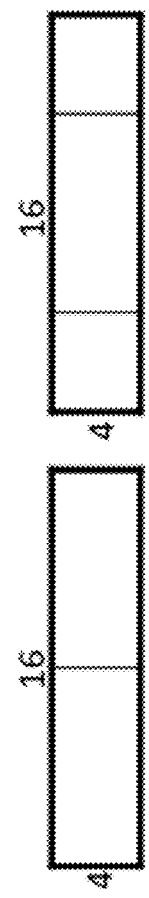
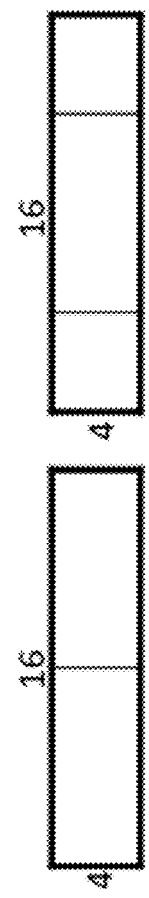
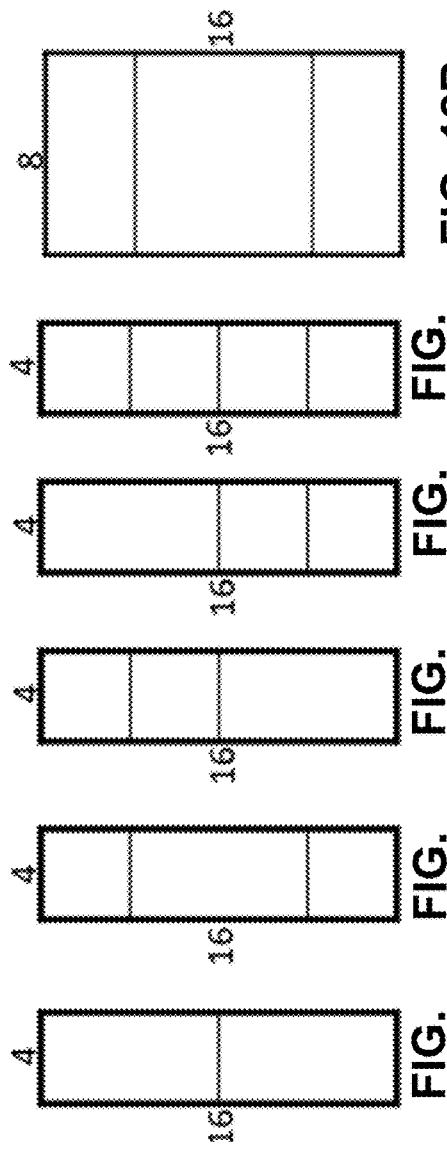
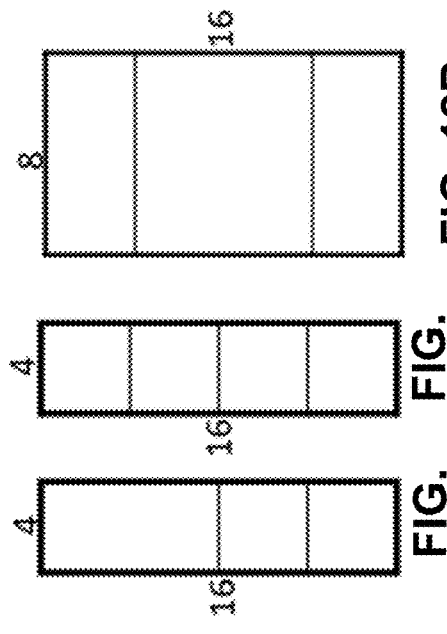
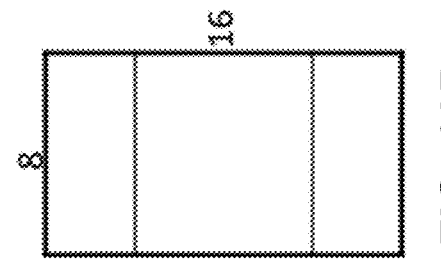
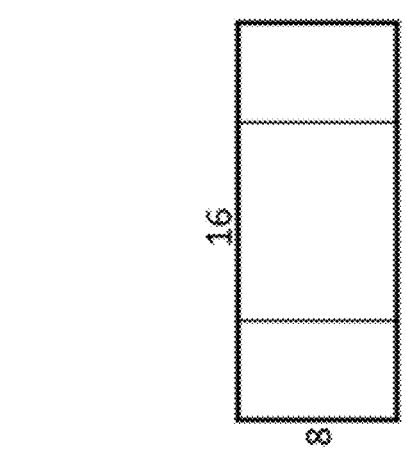
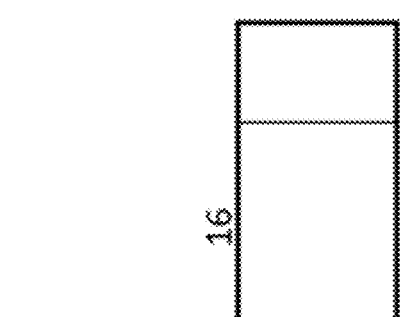

CHROMA INTRA PREDICTION UNITS FOR VIDEO CODING

This application claims the benefit of:
U.S. Provisional Application No. 62/882,995, filed Aug. 5, 2019;
U.S. Provisional Application No. 62/885,069 filed Aug. 9, 2019;
U.S. Provisional Application No. 62/889,378 filed Aug. 20, 2019; and
U.S. Provisional Application No. 62/902,188 filed Sep. 18, 2019; the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for chroma intra prediction units, such as example techniques for extending the smallest chroma intra prediction units. The example techniques may be used with the versatile video coding (VVC) standard, high efficiency video coding (HEVC) standard, or other video coding standards. The example techniques are not limited to video coding standards and may be available for video coding generally.

According to one example, a method includes determining that a block of the video data is formatted in accordance with a 4:4:4 video coding format; determining that the block of the video data is encoded in an intra prediction mode; determining that a smallest chroma intra prediction unit (SCIPU) is disabled for the block in response to determining that the block has the 4:4:4 video coding format; decoding the block of the video data based on the determination that the SCIPU is disabled; and outputting decoded video data comprising a decoded version of the block.

According to another example, a device for decoding video data includes a memory configured to store video data and one or more processors implemented in circuitry and configured to determine that a block of the video data is formatted in accordance with a 4:4:4 video coding format; determine that the block of the video data is encoded in an intra prediction mode; determine that a smallest chroma intra prediction unit (SCIPU) is disabled for the block in response to determining that the block has the 4:4:4 video coding format; decode the block of the video data based on the determination that the SCIPU is disabled; and output decoded video data comprising a decoded version of the block.

According to another example, a computer-readable storage medium stores instructions that when executed by one or more processors cause the one or more processor to determine that a block of the video data is formatted in accordance with a 4:4:4 video coding format; determine that the block of the video data is encoded in an intra prediction mode; determine that a smallest chroma intra prediction unit (SCIPU) is disabled for the block in response to determining that the block has the 4:4:4 video coding format; decode the block of the video data based on the determination that the SCIPU is disabled; and output decoded video data comprising a decoded version of the block.

According to another example, an apparatus for decoding video data includes means for determining that a block of the video data is formatted in accordance with a 4:4:4 video coding format; means for determining that the block of the video data is encoded in an intra prediction mode; means for determining that a smallest chroma intra prediction unit (SCIPU) is disabled for the block in response to determining that the block has the 4:4:4 video coding format; means for decoding the block of the video data based on the determination that the SCIPU is disabled; and means for outputting decoded video data comprising a decoded version of the block.

The details of one or more examples are set forth in the accompanying drawings and the description below. Other features, objects, and advantages will be apparent from the description, drawings, and claims.

BRIEF DESCRIPTION OF DRAWINGS

FIG. 9 is a mapping table for determining angular angles for intra prediction.

FIGS. 11A and 11B are conceptual diagrams illustrating examples of a smallest chroma intra prediction unit (SCIPU).

FIGS. 12A-12S are conceptual diagrams illustrating additional examples of SCIPUs.

DETAILED DESCRIPTION

Figure 1:
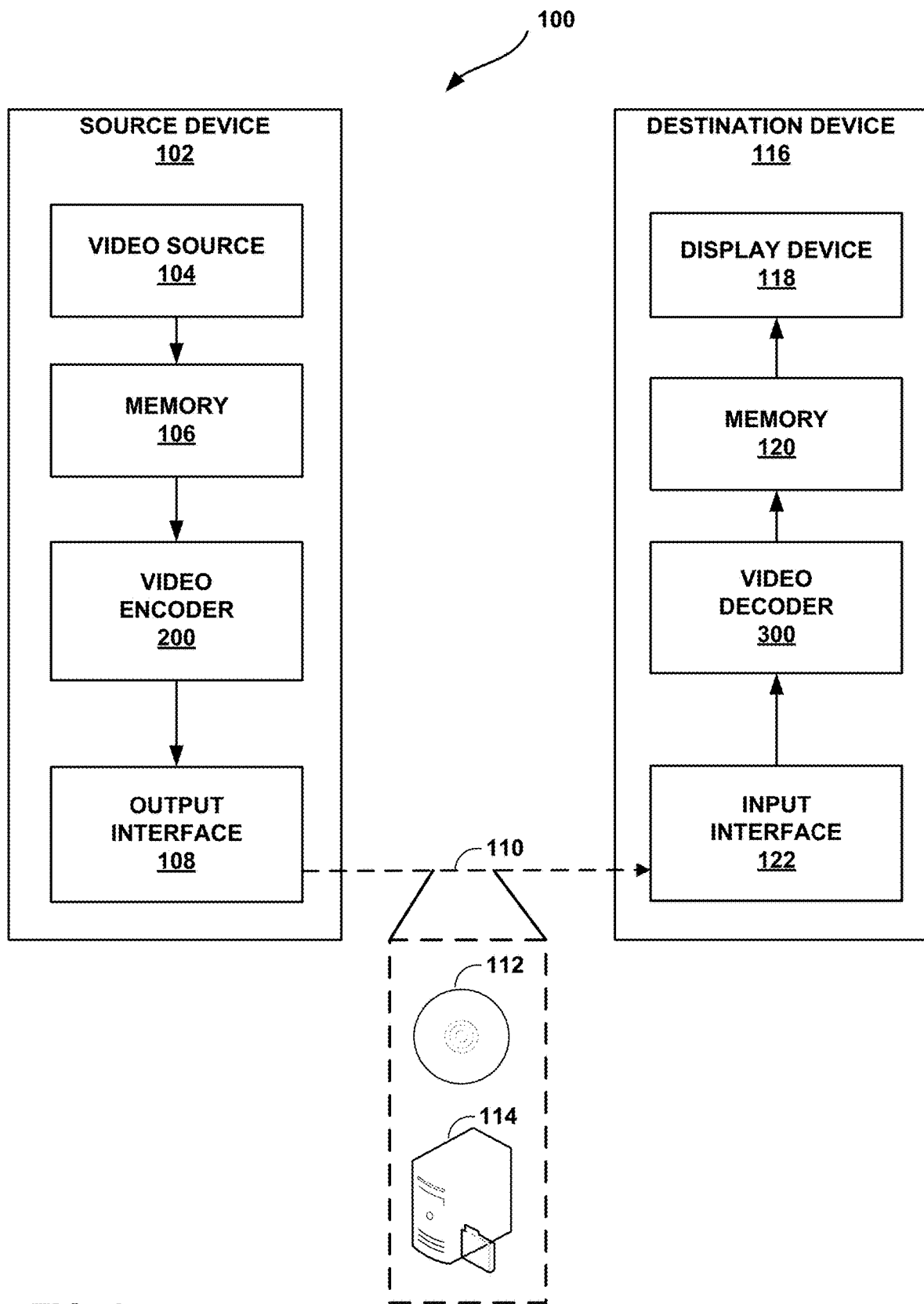
FIG. 1 is a block diagram illustrating an example video encoding and decoding system that may perform the techniques of this disclosure.

This disclosure describes techniques related to the operation of video coders (e.g., video encoders and/or video decoders). Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that the transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure are generally related to intra prediction. More specifically, the techniques of this disclosure are related to smallest chroma intra prediction units (SCIPUs). In typical video decoders, particularly hardware-based video decoders, small blocks reduce processing throughput compared to larger blocks. This reduction in processing throughput is mainly caused by small intra predicted blocks because, unlike small inter predicted blocks, small intra predicted blocks cannot be processed in parallel due to data dependency between neighboring blocks. For example, to generate a prediction block for an intra predicted block, a video decoder needs to have already decoded the top and left boundary reconstructed samples from neighboring blocks, thus requiring intra predicted blocks to be processed sequentially with neighboring blocks instead of in parallel.

In order to increase the worst-case processing throughput in the newly emerging Versatile Video Coding (VVC) standard, SCIPUs were adopted. SCIPUs disallow chroma intra CBs smaller than 16 chroma samples by constraining the partitioning of chroma intra CBs. Existing techniques for implementing SCIPUs, however, may prevent the use of smaller chroma blocks in some coding scenarios where the use of smaller chroma blocks could improve coding performance. For example, in a 4:4:4 video format, the luma component and chroma components have the same size, and there are no 2×2, 4×2 or 2×4 chroma blocks. Thus, implementing SCIPU constraints for such video unnecessarily restricts the partitioning options for 4:4:4 video to include certain types of small blocks, which can decrease coding quality. By determining that SCIPU constraints are disabled for a block in response to determining that the block has a 4:4:4 video coding format, the techniques of this disclosure may advantageously enable video encoders and video decoders to disable SCIPU in coding scenarios where smaller blocks may produce better coding performance. According to the techniques of this disclosure, a video coder may still determine that the SCIPU is enabled for a second block in response to determining that the second block has a non-4:4:4 video coding format, thus still reducing the worst-case complexity. As used in this disclosure, enabling an SCIPU generally refers to setting the smallest allowed size for a block to a size of the SCIPU, and disabling SCIPU means not setting the smallest allowed size for a block to a size of the SCIPU, such that blocks smaller than the size of the SCIPU may be used.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for enabling and disabling SCIPU. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for enabling and disabling SCIPU described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as VVC. A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). Another draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-v16 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block (CB) is an M×N block of samples for some values of M and N such that a division of a CTB into CBs is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to determine and/or utilize an SCIPU based on one or more example techniques described in this disclosure. In some examples, video encoder 200 and video decoder 300 may utilize the chroma block size to determine the SCIPU. In some examples, video encoder 200 and video decoder 300 may utilize the chroma block size and luma block size to determine the SCIPU. The disclosure also describes example techniques for removing narrow vertical intra blocks (e.g., 2×N sized blocks) and example techniques for adaptive split of the chroma area of an intra SCIPU.

As described in more detail below, determining and utilizing SCIPU, in accordance with one or more examples described in this disclosure, may result in better operation of video encoder 200 and video decoder 300. For instance, block size may impact how quickly video encoder 200 and video decoder 300 can encode or decode a picture. Smaller sized blocks may result in longer encoding and decoding time due to there being many more blocks in a picture as compared to larger sized blocks, but may also result in decreased distortion. By using techniques described in this disclosure, the operation of video encoder 200 and video decoder 300 may be improved to ensure encoding and decoding is performed in a timely manner to minimize processing delays, while still allowing for the improved video quality enabled by smaller blocks. Accordingly, by selectively enabling and disabling SCIPU based on video coding format, the example techniques described in this disclosure provide for a practical application of the technology of video coding that improves the overall operation of video encoder 200 and video decoder 300.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
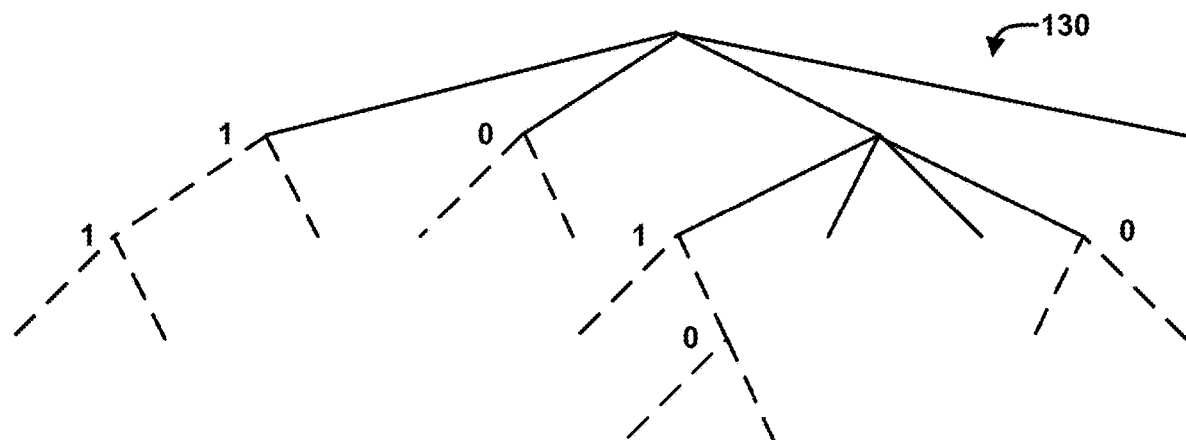
FIGS. 2A and 2B are conceptual diagrams illustrating an example quadtree binary tree (QTBT) structure, and a corresponding coding tree unit (CTU).
Figure 2B:
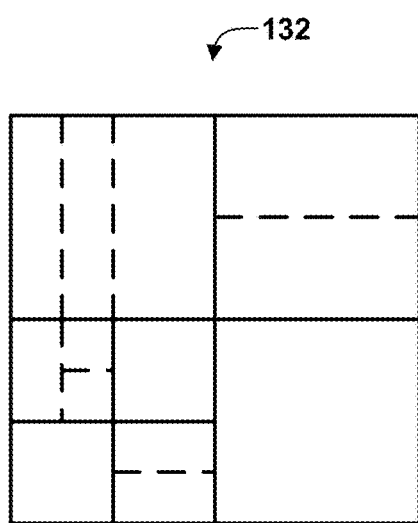
Figure 3A:
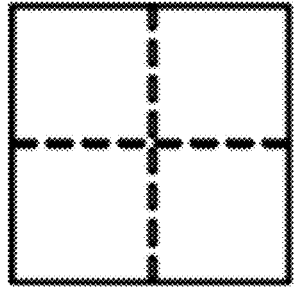
FIGS. 3A-3E are conceptual diagrams illustrating examples of multi-type tree splitting modes.
Figure 3B:
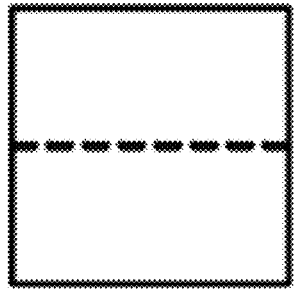
Figure 3C:
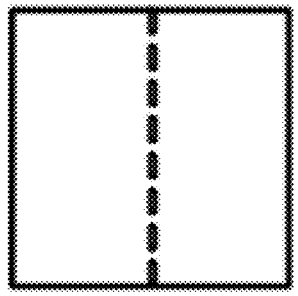
Figure 3D:
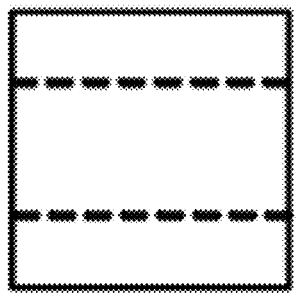
Figure 3E:
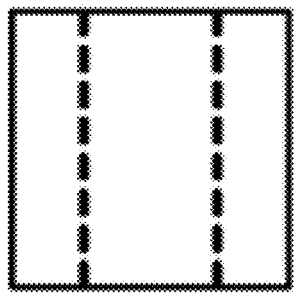

FIGS. 2A and 2B are conceptual diagram illustrating an example quadtree binary tree (QTBT) structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

The following describes partitioning structures implemented in VVC Draft 6 and HEVC. In HEVC, a video coder can split a CTU into CUs by using a quaternary-tree structure, denoted as a coding tree, to adapt to various local characteristics, as described in J. Chen, Y. Ye, S. H. Kim, "Algorithm description for Versatile Video Coding and Test Model 5 (VTM 5)", JVET-N1002. Video encoder 200 determines whether to code a picture area using inter-picture (temporal) or intra-picture (spatial) prediction at the leaf CU level. Each leaf CU can be further split into one, two, or four PUs according to the PU splitting type. Inside one PU, the same prediction process is applied, and the relevant information is signaled in the encoded video data on a PU basis. After obtaining the residual, based on a comparison of the prediction block to an original block of the video data, a leaf CU can be partitioned into TUs according to another quaternary-tree structure like the coding tree for the CU. The HEVC splitting structure utilizes multiple partition types, namely CUs, PUs, and TUs.

In VVC, the concept of multiple partition unit types has been replaced with a quadtree structure that includes nested multi-type tree with binary and ternary split segmentation structures. Thus, VVC removes the separation of the CU, PU, and TU except as needed for CUs that have a size too large for the maximum transform length. VVC also supports more flexibility for CU partition shapes. In the coding tree structure, a CU can have either a square or rectangular shape. A CTU is first partitioned by a quaternary tree (a.k.a. quadtree) structure. Then the quaternary tree leaf nodes can be further partitioned by a multi-type tree structure.

FIGS. 3A-3E are conceptual diagrams illustrating examples of multi-type tree splitting modes. As shown in FIGS. 3A-3E, there are five splitting types in a multi-type tree structure. These five splitting types are the quad-tree partitioning shown in FIG. 3A, the vertical binary-tree partitioning shown in FIG. 3B (e.g., vertical binary splitting (SPLIT_BT_VER)), the horizontal binary-tree partitioning shown in FIG. 3C (e.g., horizontal binary splitting (SPLIT_BT_HOR)), the vertical ternary-tree partitioning shown in FIG. 3D (e.g., vertical ternary splitting (SPLIT_TT_VER)), and the horizontal ternary-tree partitioning shown in FIG. 3E (e.g., horizontal ternary splitting (SPLIT_TT_HOR)). The multi-type tree leaf nodes correspond to CUs, and unless a CU is too large for the maximum transform length, the same segmentation used for prediction processing is also used for transform processing without any further partitioning. This means that, in most cases, the CU, PU and TU have the same block size in the quadtree with nested multi-type tree CB structure. The exception occurs when maximum supported transform length is smaller than the width or height of the color component of the CU.

A CTU includes a luma CTB and two chroma CTBs. At the CU level, a CU is associated with a luma CB and two chroma CBs. In VVC, the chroma and luma CBs of an intra coded CU can share a single tree structure or use different tree structures, referred to as dual trees. For inter slices, the chroma and luma CBs of a CU may share a tree structure. In an inter slice, there may be intra blocks. The use of a local dual tree structure in an inter slice can avoid small chroma intra blocks. In a local dual tree, all luma blocks are intra coded, intra block copy coded, or palette coded, and the chroma is not split. The size of a CTU can be up to 128×128 for a luma component, while the size of a coding unit may range from 4×4 to the full size of the CTU. In this scenario, the size of a chroma block could be 2×2, 2×4, or 4×2 in 4:2:0 color format. That is, due to the chroma sub-sampling used for non-4:4:4 video coding formats, a 4×4 luma block may correspond to chroma blocks that are smaller than 4×4.

Figure 4:
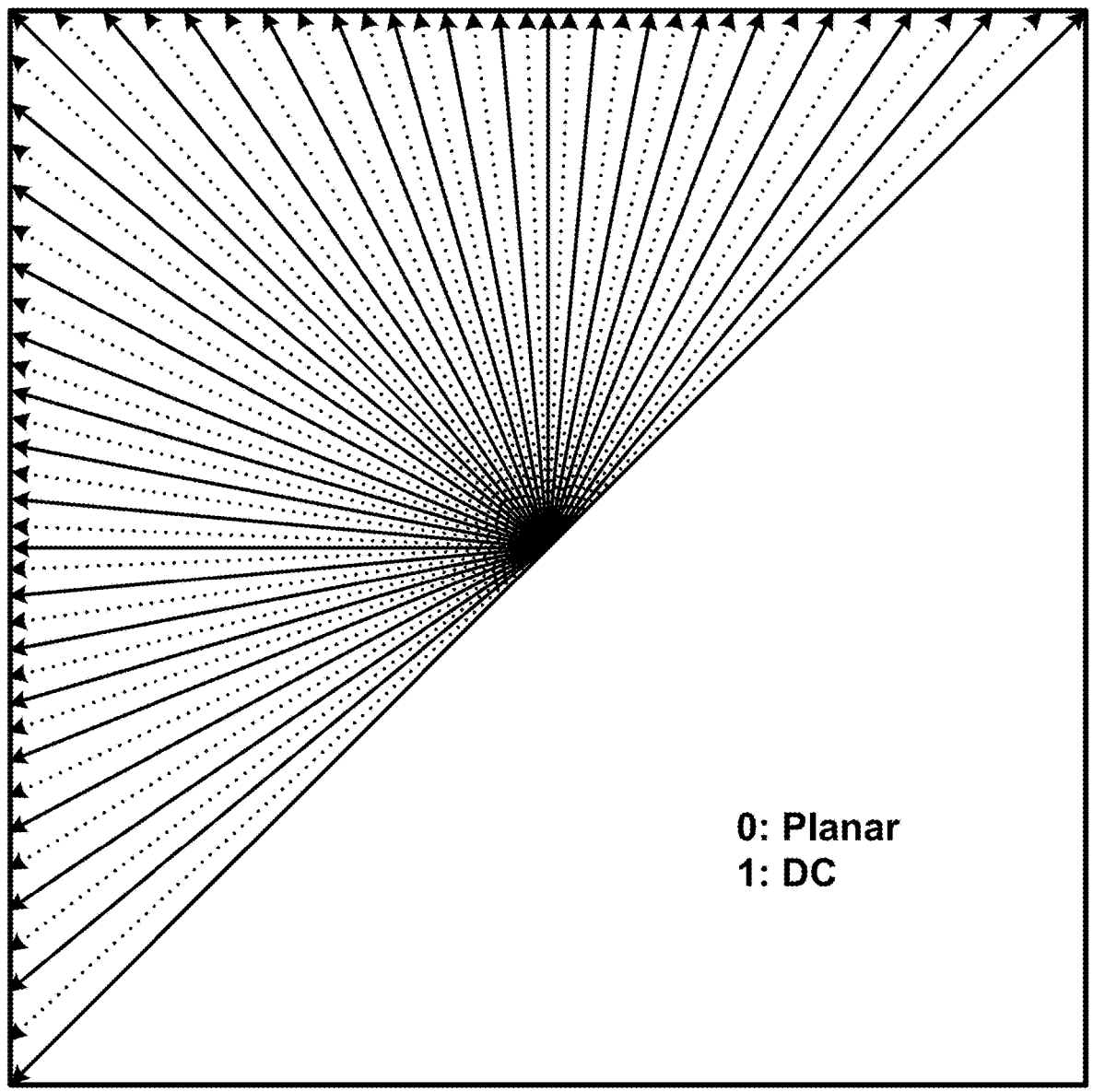
FIG. 4 is a conceptual diagram illustrating an example of direction of intra prediction with arrows pointing towards reference samples.

As described above, the example techniques described in this disclosure may be related to coding blocks using intra prediction modes. The following describes intra prediction angles and wide-angle intra prediction. Intra prediction involves DC prediction mode, Planar prediction mode and directional (or angular) prediction mode. Directional prediction for square blocks uses directions between −135 degrees to 45 degrees of the current block in the VVC test model 2 (VTM2) J. Chen, Y. Ye, S. Kim, "Algorithm description for Versatile Video Coding and Test Model 2 (VTM2)," 11$^{th}$ JVET Meeting, Ljubljana, SI, July 2018, JVET-K1002, as illustrated in FIG. 4.

In VTM2, the block structure used for specifying the prediction block for intra prediction is not restricted to be square (width w=height h). Rectangular or non-square prediction blocks (w>h or w<h) can increase the coding efficiency based on the characteristics of the content.

Figure 5:
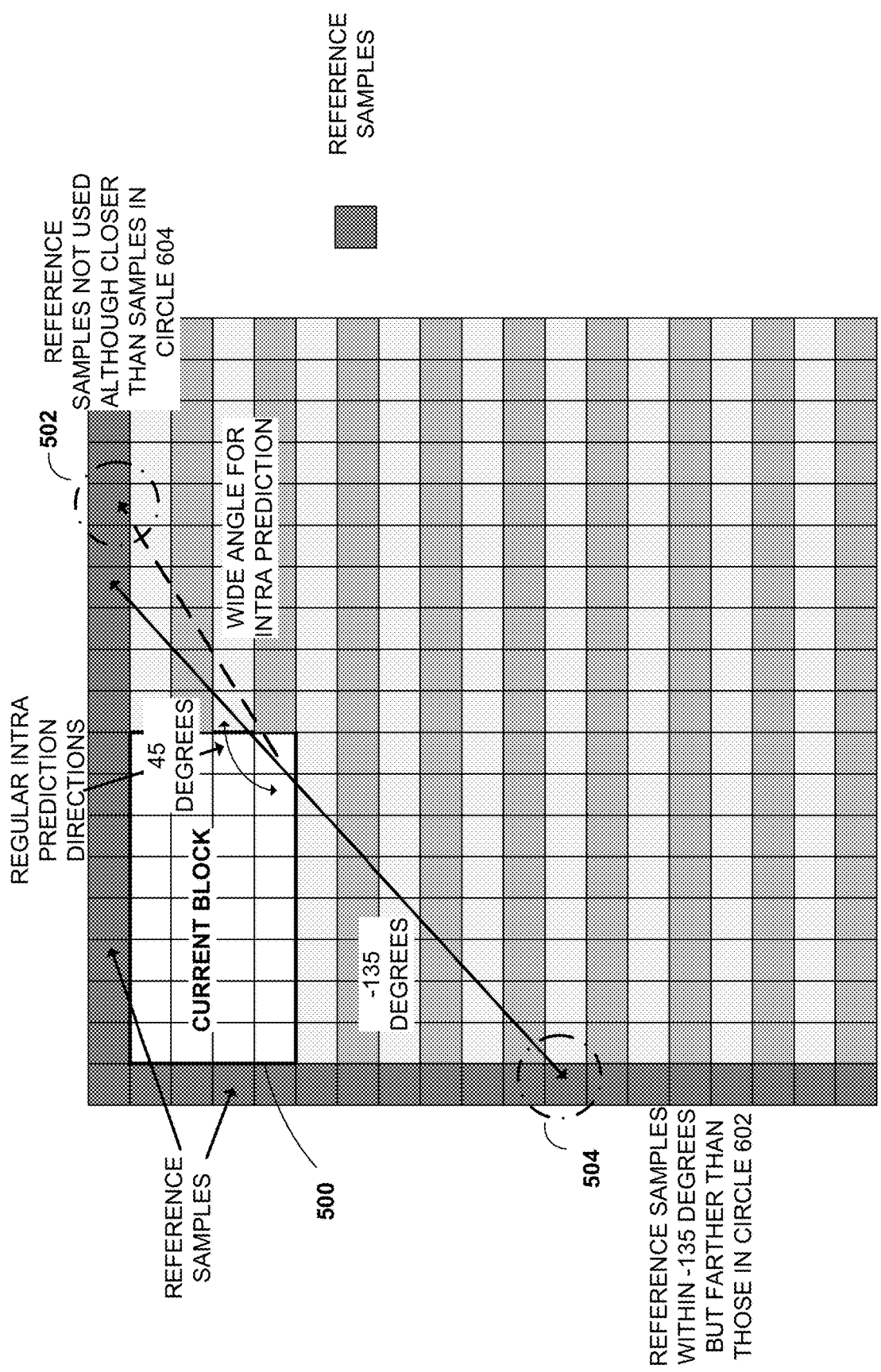
FIG. 5 is a conceptual diagram illustrating an example of an 8×4 rectangular block that is intra-predicted.

In such rectangular blocks, restricting the direction of intra prediction to be within −135 degrees to 45 degrees can result in situations where farther reference samples are used rather than closer reference samples for intra prediction. Such a design is likely to have an impact on the coding efficiency. It may be more beneficial to have the range of restrictions relaxed so that closer reference samples (beyond the −135 to 45-degree angle) can be used for prediction. An example of such a case is given in FIG. 5. For example, FIG. 5 illustrates an example of 8×4 rectangular block, identified as current block 500, where closer reference samples are not used (e.g., such as reference sample 502), but farther reference samples may be used (e.g., such as reference sample 504), due to restriction of intra prediction direction to be in the range −135 degrees to 45 degrees.

During the 12$^{th}$ JVET meeting, a modification of wide-angle intra prediction was adopted into VVC Test Model 3.0 (VTM3), as described in the following documents: L. Zhao, X. Zhao, S. Liu, X. Li, "CE3-related: Unification of angular intra prediction for square and non-square blocks," 12$^{th}$ JVET Meeting, Macau SAR, CN, October 2018, JVET-L0279, J. Chen, Y. Ye, S. Kim, "Algorithm description for Versatile Video Coding and Test Model 3 (VTM3)," 12$^{th}$ JVET Meeting, Macau SAR, CN, October 2018, JVET-L1002, and B. Bross, J. Chen, S. Liu, "Versatile Video Coding (Draft 3)," 12$^{th}$ JVET Meeting, Macau SAR, CN, October 2018, JVET-L1001.

Figure 6A:
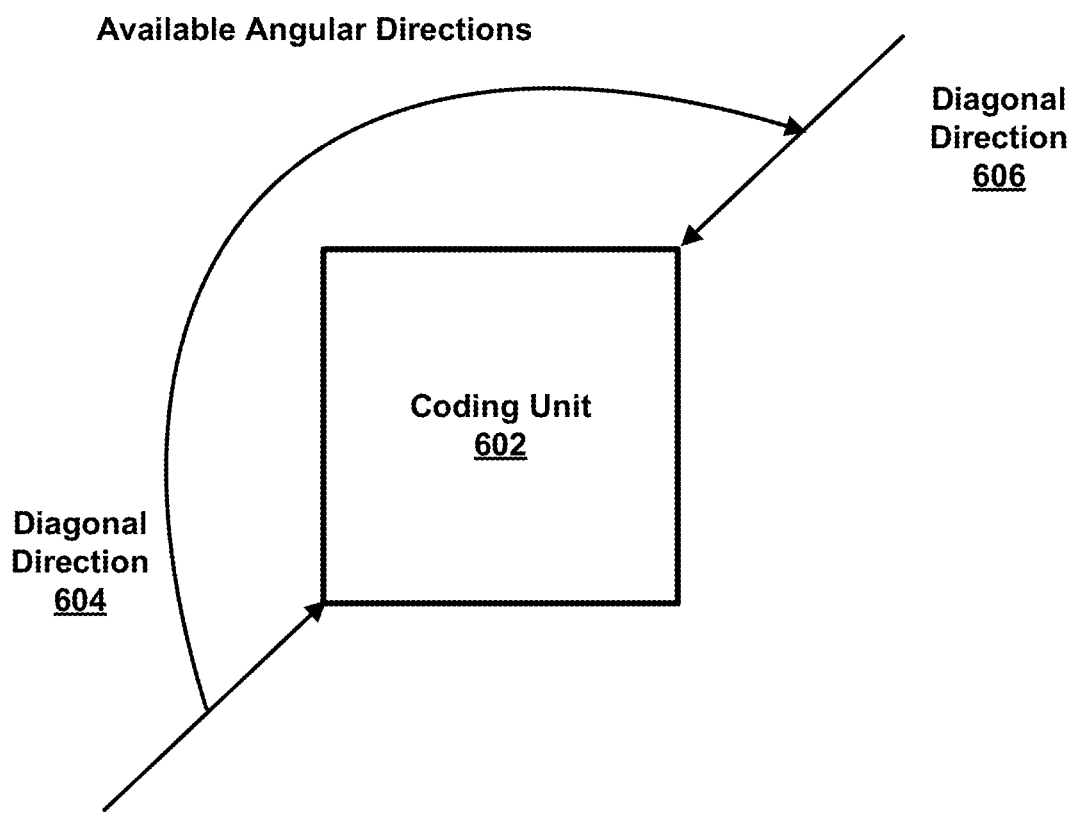
FIGS. 6A-6C are conceptual diagrams illustrating mode mapping process for modes outside the diagonal direction range.
Figure 6B:
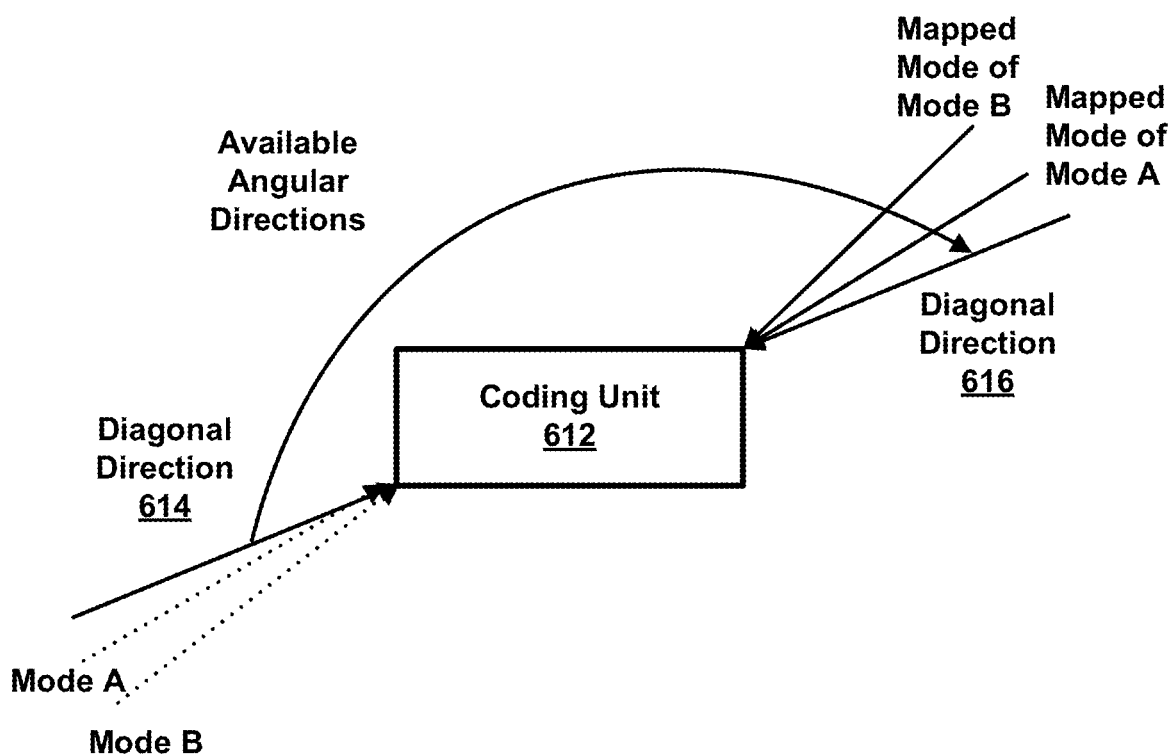
Figure 6C:
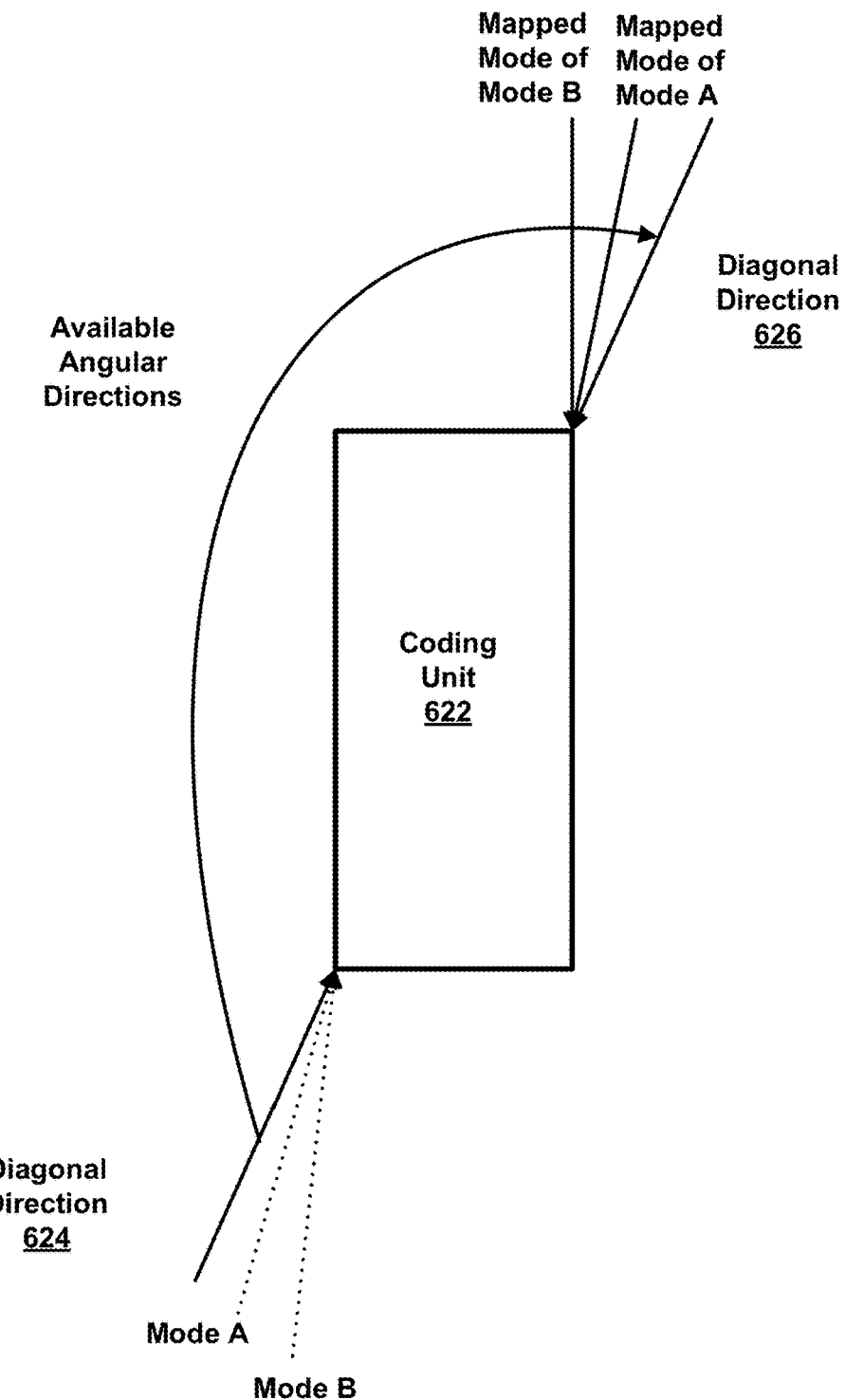

This adoption of wide-angle intra prediction includes two modifications to unify the angular intra prediction for square and non-square blocks. Firstly, angular prediction directions are modified to cover diagonal directions of all block shapes. Secondly, all angular directions are kept within the range between the bottom-left diagonal direction and the top-right diagonal direction for all block aspect ratios (square and non-square) as illustrated in FIGS. 6A-6C. FIG. 6A illustrates that square block (e.g., coding unit 602) does not require angular mode remapping (e.g., angular directions between diagonal direction 604 and diagonal direction 606 are available). FIG. 6B illustrates angular mode remapping for horizontal non-square block (e.g., coding unit 612). For instance, there may be mode mapping of mode A and Mode B that are outside of diagonal direction 614 to be within diagonal direction 614 and diagonal direction 616. FIG. 6C illustrates angular remapping for vertical non-square block (e.g., coding unit 622). For instance, there may be mode mapping of mode A and Mode B that are outside of diagonal direction 624 to be within diagonal direction 624 and diagonal direction 626.

Figure 7:
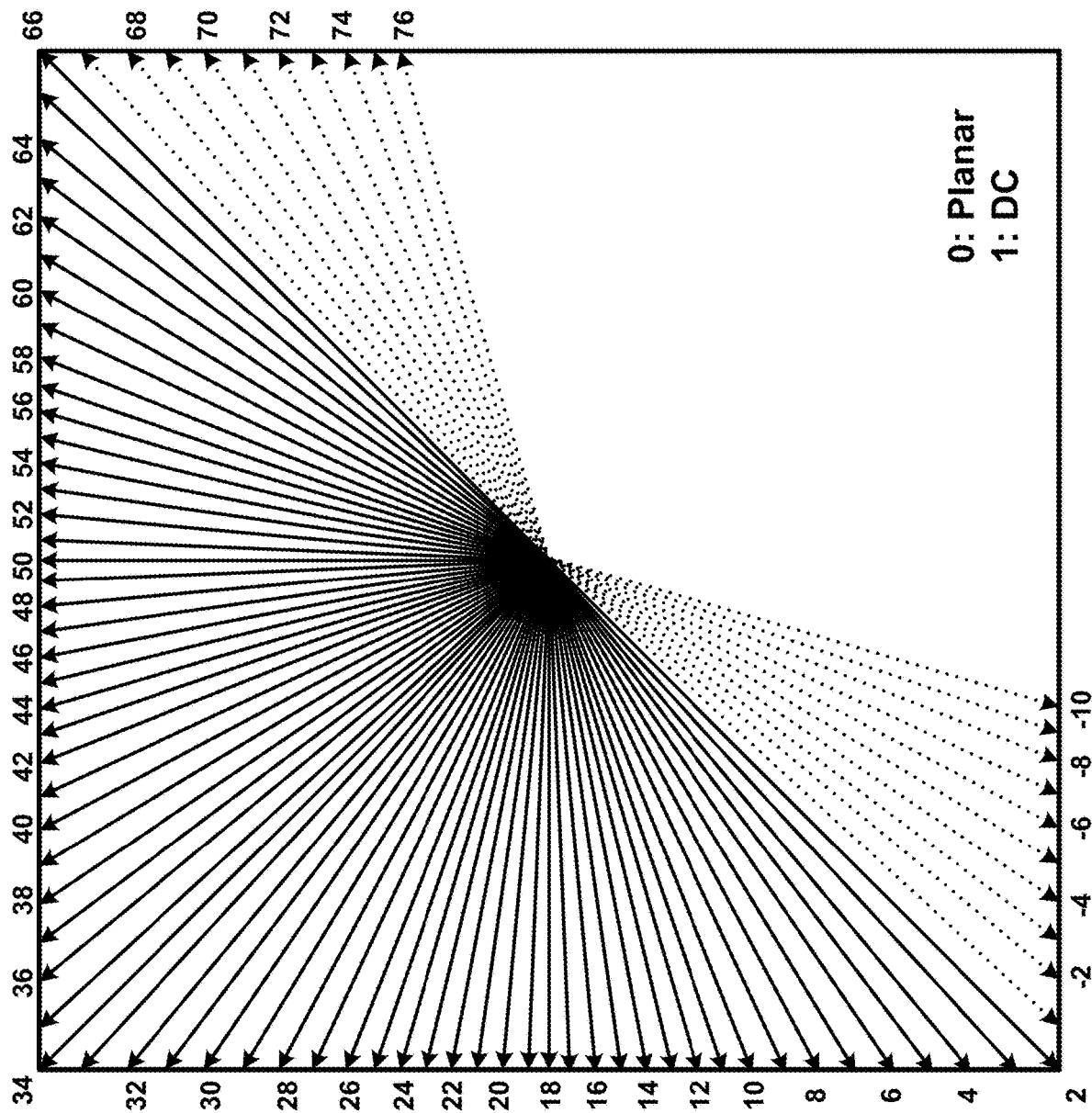
FIG. 7 is a conceptual diagram illustrating wide angles (−1 to −10 and 67 to 76) in addition to 65 angular modes.
Figure 8:
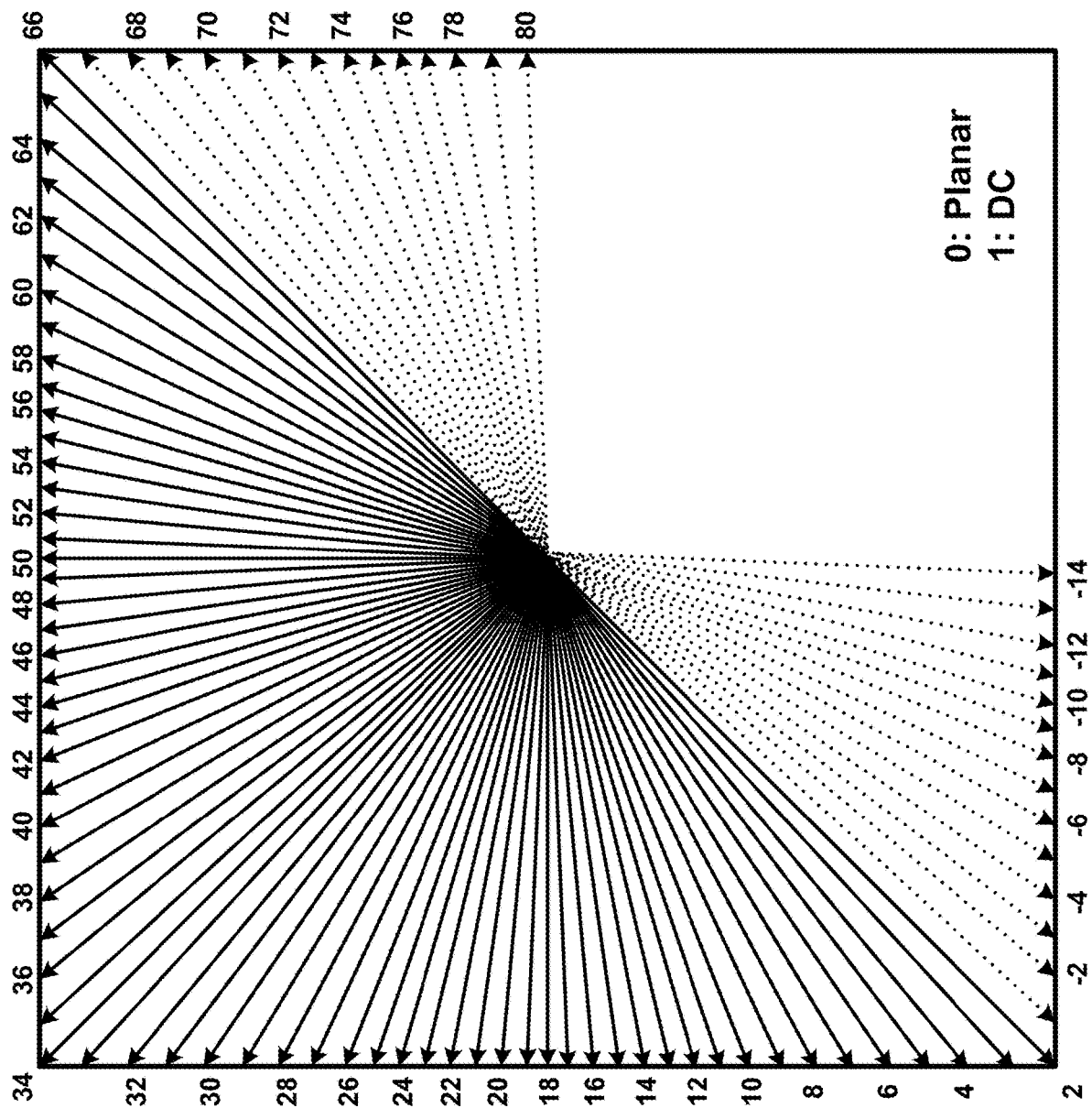
FIG. 8 is a conceptual diagram illustrating wide angles (−1 to −14 and 67 to 80) beyond modes 2 and 6 for a total of 93 angular mode.

In addition, the number of reference samples in the top reference row and left reference column are restricted to 2*width+1 and 2*height+1 for all block shapes. An illustration of wider angles that are adopted in VTM3 is provided in FIG. 8 (e.g., relative to FIG. 7). Although VTM3 defines 95 modes, for any block size, only 67 modes may be allowed. The exact modes that are allowed depend on the ratio of block width to height. Allowance of exact modes is done by restricting the mode range for certain blocks sizes.

FIG. 9 specifies the mapping table between predModeIntra and the intra prediction angle parameter intraPredAngle in VTM3, as described in JVET-L1001. The angular modes corresponding with non-square block diagonals, vertical and horizontal modes, and square block diagonal modes are utilized. In FIG. 9, angular modes with a positive intraPredAngle value are referred to as positive angular modes (mode index<18 or >50), while angular modes with a negative intraPredAngle value are referred to as negative angular modes (mode index>18 and <50).

VVC Draft 6 supports 8 intra prediction modes for the chroma component including PLANAR, VER, HOR, DC, LM, MDLM_L, MDLM_T, and DM. In order to encode a chroma intra coded CU, a flag is used to indicate whether this CU is DM coded or not. If the CU is decided to be DM, the intra prediction mode of the corresponding luma component is used to get the prediction for this CU. Otherwise, the mode of the CU is signaled by video encoder 200 to video decoder 300. The VER and HOR modes respectively use the available reconstructed samples of the top and left neighboring blocks to predict the current block. The PLANAR and DC modes use the available reconstructed samples of both the top and left neighboring blocks for prediction. For the LM, MDLM_L, and MDLM_T, the reconstructed samples of the corresponding luma blocks are used for the prediction.

The following describes intra prediction samples. The samples in the neighborhood of a CB are used for intra prediction of the block. Typically, the reconstructed reference sample lines that are closest to the left and the top boundaries of the CB are used as the reference samples for intra prediction. However, VVC Working Draft 4, Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, MA, 9-18 Jan. 2019, JVET-O1001-v7 (hereinafter "VVC Draft 4"), also enables other samples in the neighborhood of the CB to be used as reference samples.

Figure 10:
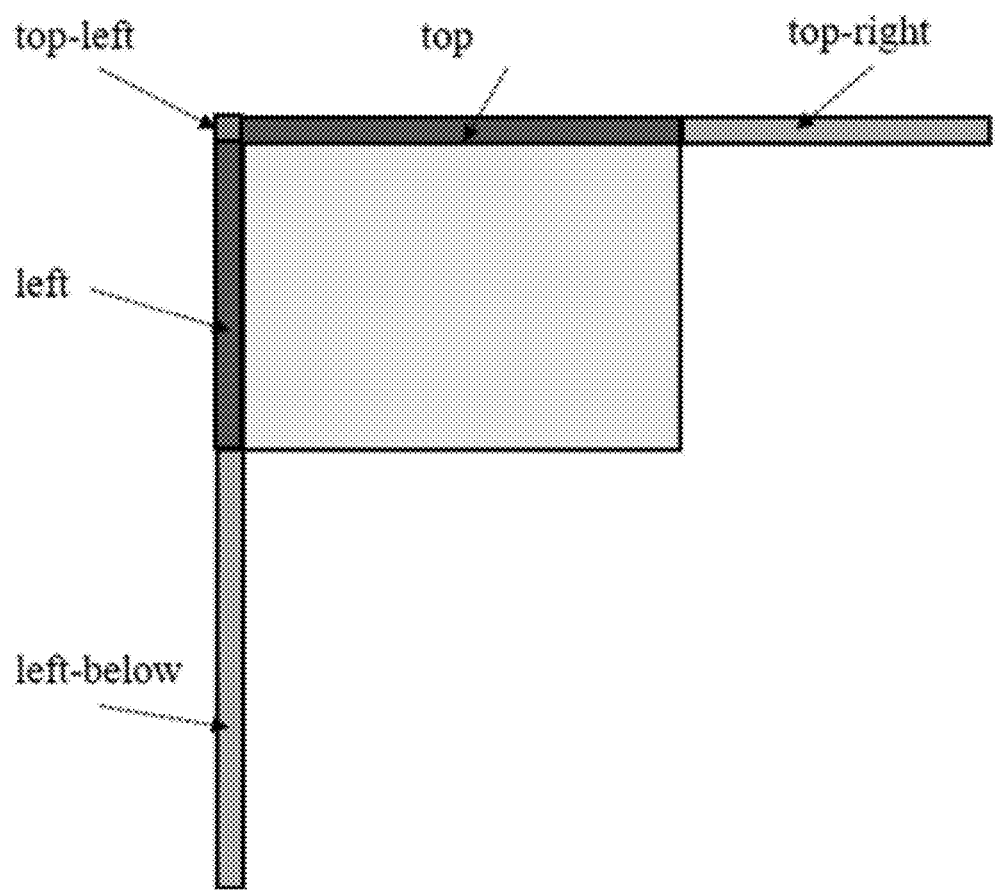
FIG. 10 is a conceptual diagram illustrating examples of neighboring samples used for intra prediction.

In VVC Draft 4, only reference lines with MRLIdx equal to 0, 1 and 3 can be used for the luma component. For the chroma component, only the reference line with MRLIdx equal to 0 can be used as depicted in FIG. 10. The index to the reference line used for coding the block (values 0, 1 and 2 indicating lines with MRLIdx 0, 1 and 3, respectively) is coded with truncated unary codeword. Planar and DC modes are not used for the reference line with MRLIdx>0. In some examples, only the available samples of the neighborhood of a CB can be added to the reference array for intra-prediction.

The following describes SCIPU. In typical hardware video encoders and decoders, processing throughput is reduced when a picture has more small blocks. Such processing throughput drop mainly comes from small intra blocks, because small inter blocks can be processed in parallel while intra blocks have data dependency between neighboring blocks (e.g., the predictor generation of an intra block requires top and left boundary reconstructed samples from neighboring blocks) and are processed sequentially.

In HEVC, the worst-case processing throughput occurs when 4×4 chroma intra blocks are processed. In VTM4.0, the size of the smallest chroma intra block is 2×2, and the reconstruction process of a chroma intra block becomes very complex due to the adoption of new tools.

In order to increase the worst-case processing throughput in VVC, SCIPUs were proposed in Z.-Y. Lin, T.-D. Chuang, C.-Y. Chen, Y.-W. Huang, S.-M. Lei, Y. Zhao, H. Yang, "CE3-2.1.1 and CE3-2.1.2: Removing 2×2, 2×4, and 4×2 chroma CBs", JVET-O0050. SCIPU has been adopted into the VVC Draft 6 in the 15th JVET in Gothenburg. The goal of the techniques for SCIPUs is to disallow chroma intra CBs smaller than 16 chroma samples by constraining the partitioning of chroma intra CBs.

In single coding tree, an SCIPU is defined as a coding tree node whose chroma block size is larger than or equal to threshold (TH) chroma samples and has at least one child luma block smaller than 4TH luma samples, where TH is set to 16, as one example. In some examples, in each SCIPU, all CBs are inter, or all CBs are non-inter, (i.e., either intra or IBC). In case of a non-inter SCIPU, in some examples, chroma of the non-inter SCIPU may not (e.g., shall not) be further split and luma of the SCIPU is allowed to be further split. In this way, the smallest chroma intra CB size is 16 chroma samples, and 2×2, 2×4, and 4×2 chroma CBs are removed. In addition, chroma scaling is not applied in case of a non-inter SCIPU.

Two SCIPU examples are shown in FIGS. 11A and 11B. In FIG. 11A, one chroma CB of 8×4 chroma samples and three luma CBs (4×8, 8×8, 4×8 luma CBs) form one SCIPU because the ternary tree (TT) split from the 8×4 chroma samples would result in chroma CBs smaller than 16 chroma samples. In FIG. 11B, one chroma CB of 4×4 chroma samples (the left side of the 8×4 chroma samples) and three luma CBs (8×4, 4×4, 4×4 luma CBs) form one SCIPU, and the other one chroma CB of 4×4 samples (the right side of the 8×4 chroma samples) and two luma CBs (8×4, 8×4 luma CBs) form one SCIPU because the binary tree (BT) split from the 4×4 chroma samples would result in chroma CBs smaller than 16 chroma samples. FIGS. 12A-12S are conceptual diagrams illustrating additional examples of SCIPUs. The size is in the luma component.

The type of an SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signaled flag before parsing the CUs in the SCIPU. By applying the above two methods, the worst-case hardware processing throughput occurs when 4×4, 2×8, or 8×2 chroma blocks, instead of a 2×2 chroma blocks, are processed. The worst-case hardware processing throughput is the same as that in HEVC and is 4× of that in VTM5.0

Figure 13:
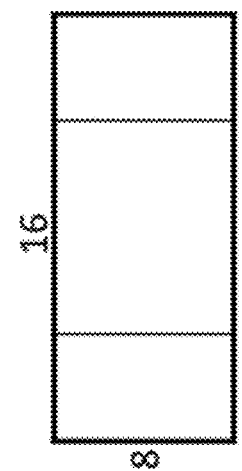
FIG. 13 is a conceptual diagram illustrating an example of a luma area.

However, there may be issues determining and utilizing the SCIPU as described in VVC Draft 6. As one example of issues with determining and utilizing the SCIPU, in VVC Draft 6, an SCIPU is decided (e.g., determined) based on the size and the split of the luma area (e.g., samples in a luma component). Using this approach, the SCIPU does not work correctly in different chroma format. As an example, FIG. 13 illustrates a luma block with the size of 16×8 and ternary tree (TT) split in vertical direction and the threshold of 16 samples in chroma size. The block size of the corresponding chroma area for the luma block of FIG. 13 are in different chroma formats, as illustrated in FIGS. 14A-14C.

Figure 14C:
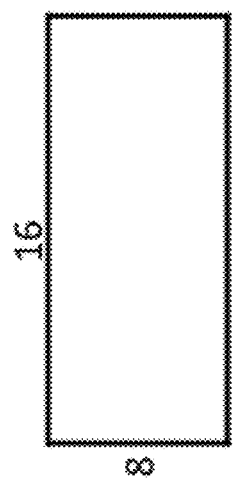
FIGS. 14A-14C are conceptual diagrams illustrating examples of corresponding chroma area for the luma area of FIG. 13 in different chroma formats.
Figure 14B:
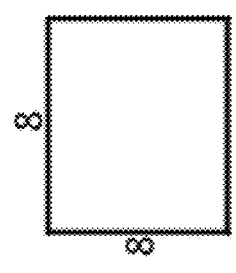
Figure 14A:
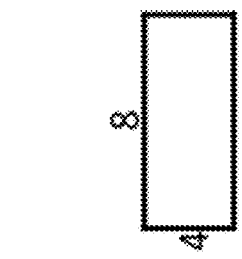

In the 4:2:0 format, the chroma area has the size of 4×8, as illustrated in FIG. 14A. Since the TT vertical split results in 2×4 blocks, it (e.g., a chroma block that includes the chroma area, such as a chroma block of 4×8) is considered as an SCIPU (8 samples<16).

In the 4:2:2 format, the chroma area has the size of 8×8, as illustrated in FIG. 14B. With the TT vertical split, the smallest size of the sub-blocks is 2×8. Therefore, it (e.g., chroma block with size 8×8 or sub-block with size 2×8) may not be considered as an SCIPU.

In the 4:4:4 format, the chroma area has the size of 8×16, as illustrated in FIG. 14C. With the TT vertical split, the smallest size of the sub-blocks is 4×8. In this case, the chroma is not an SCIPU.

As another example of issues with determining and utilizing the SCIPU, the implementation of SCIPU in VVC Draft 6 does not permit intra prediction for 2×2 and 2×4 blocks. However, VVC Draft 6 does permit vertical narrow intra chroma blocks. This type of block size (e.g., vertical narrow intra chroma blocks) may reduce the performance of data accessing.

As another example of issues with determining and utilizing the SCIPU, in VVC Draft 6, split of chroma area of an intra SCIPU is not allowed to avoid 2×2, 2×4 and 4×2. However, for a large chroma area of an SCIPU (e.g., 8×4 and 4×8), some splits may not result in such small blocks. Disabling splits of these large chroma area may lead to performance losses.

This disclosure describes example techniques to address one or more of the example issues described above. This disclosure also describes techniques for signaling whether SCIPU is coded using inter prediction or intra prediction. The example techniques may be performed separately or together in any or multiple different combinations. Although the example techniques may address the above described issues, the example techniques should not be considered as limited to addressing one or more of the above described issues.

Also, simply to ease with understanding, some of the example techniques are described with respect to changes to VVC Draft 6, and particularly section 7.4.9.4 of VVC Draft 6. A portion of section 7.4.9.4 of VVC Draft 6 is reproduced below to ease with understanding potential changes to VVC Draft 6 in accordance with one or more examples described in this disclosure.

7.4.9.4 Coding Tree Semantics
The variable modeTypeCondition is derived as follows, for each CTU:
   If one of the following conditions is true, modeTypeCondition is set equal to 0
     slice_type==I and qtbtt_dual_tree_intra_flag is equal to 1
     modeTypeCurr is not equal to MODE_TYPE_ALL
   Otherwise, if one of the following conditions is true, modeTypeCondition is set equal to 1
     cbWidth*cbHeight is equal to 64 and split_qt_flag is equal to 1
     cbWidth*cbHeight is equal to 64 and MttSplitMode[x0][y0][mttDepth] is equal to SPLIT_TT_HOR or SPLIT_TT_VER
     cbWidth*cbHeight is equal to 32 and MttSplitMode[x0][y0][mttDepth] is equal to SPLIT_BT_HOR or SPLIT_BT_VER
   Otherwise, if one of the following conditions is true, modeTypeCondition is set equal to 1+(slice_type!=I?1:0)
     cbWidth*cbHeight is equal to 64 and MttSplitMode[x0][y0][mttDepth] is equal to SPLIT_BT_HOR or SPLIT_BT_VER
     cbWidth*cbHeight is equal to 128 and MttSplitMode[x0][y0][mttDepth] is equal to SPLIT_TT_HOR or SPLIT_TT_VER
   Otherwise, modeTypeCondition is set equal to 0

The following describes an example of using the chroma block size to decide the SCIPU. For example, the SCIPU may be decided (e.g., determined) based on the chroma size and the splitting of the luma area. In some examples, for partitioning of a luma area, the size of chroma area may derived by scaling the luma size by a factor that depends on the chroma format. If applying the split of luma partition to the chroma area results in chroma sub-blocks having the size smaller than threshold TH, the luma area and the corresponding chroma area is considered as an SCIPU (e.g., the luma area, the corresponding chroma area, or both the luma area and the corresponding luma area).

In one example, the derivation of the variable modeTypeCondition in the VVC Draft 6 may be modified as follows:
7.4.9.4 Coding Tree Semantics
   The variable modeTypeCondition is derived as follows:
     If one of the following conditions is true, modeTypeCondition is set equal to 0
        slice_type==I and qtbtt_dual_tree_intra_flag is equal to 1
        modeTypeCurr is not equal to MODE_TYPE_ALL
     Otherwise, if one of the following conditions is true, modeTypeCondition is set equal to 1
        (cbWidth/SubWidthC)*(cbHeight/SubHeightC) is equal to 32 and split_qt_flag is equal to 1
        (cbWidth/SubWidthC)*(cbHeight/SubHeightC) is equal to 16 and split_qt_flag is equal to 1
        (cbWidth/SubWidthC)*(cbHeight/SubHeightC) is equal to 16 and MttSplitMode[x0][y0][mttDepth] is equal to SPLIT_TT_HOR or SPLIT_TT_VER
        (cbWidth/SubWidthC)*(cbHeight/SubHeightC) is equal to 32 and MttSplitMode[x0][y0][mttDepth] is equal to SPLIT_TT_HOR or SPLIT_TT_VER and (SubHeightC==2 or SubWidthC==2)
        (cbWidth/SubWidthC)*(cbHeight/SubHeightC) is equal to 8 and MttSplitMode[x0][y0][mttDepth] is equal to SPLIT_BT_HOR or SPLIT_BT_VER
     Otherwise, if one of the following conditions is true, modeTypeCondition is set equal to 1+(slice type!=I?1:0)
        (cbWidth/SubWidthC)*(cbHeight/SubHeightC) is equal to 16 and MttSplitMode[x0][y0][mttDepth] is equal to SPLIT_BT_HOR or SPLIT_BT_VER
        (cbWidth/SubWidthC)*(cbHeight/SubHeightC) is equal to 32 and MttSplitMode[x0][y0][mttDepth] is equal to SPLIT_TT_HOR or SPLIT_TT_VER
     Otherwise, modeTypeCondition is set equal to 0

In some examples, the SCIPU may be disabled for YUV 4:4:4 format (chroma_format_idc is equal to 3), in which chroma component has the same size as in luma component. The corresponding derivation of modeTypeCondition is modified as:
7.4.9.4 Coding Tree Semantics
   The variable modeTypeCondition is derived as follows:
     If one of the following conditions is true, modeTypeCondition is set equal to 0
        slice_type==I and qtbtt_dual_tree_intra_flag is equal to 1
        modeTypeCurr is not equal to MODE_TYPE_ALL
        chroma_format_idc==3

In some examples, the SCIPU may be disabled for monochrome sampling (chroma_format_idc is equal to 0) where there is only one sample array, which is nominally considered the luma array. The corresponding derivation of modeTypeCondition is modified as:
7.4.9.4 Coding Tree Semantics
   The variable modeTypeCondition is derived as follows:
     If one of the following conditions is true, modeTypeCondition is set equal to 0
        slice_type==I and qtbtt_dual_tree_intra_flag is equal to 1
        modeTypeCurr is not equal to MODE_TYPE_ALL
        chroma_format_idc==0

In also another example, the SCIPU may be disabled for YUV 4:4:4 format and monochrome sampling while SCIPU may be enabled for other YUV formats (e.g., a combination of one or more of the example techniques described above). When the SCIPU is enabled, the chroma size and split of the corresponding luma partition may be used to decide whether the area is an SCIPU or not. In this case, the corresponding derivation of modeTypeCondition in VVC Draft 6 may be modified as follows:

7.4.9.4 Coding Tree Semantics

The variable modeTypeCondition is derived as follows:
If one of the following conditions is true, modeTypeCondition is set equal to 0
  slice_type==I and qtbtt_dual_tree_intra_flag is equal to 1
  modeTypeCurr is not equal to MODE_TYPE_ALL
  chroma_format_idc==0
  chroma_format_idc==3
Otherwise, if one of the following conditions is true, modeTypeCondition is set equal to 1
  (cbWidth/SubWidthC)*(cbHeight/SubHeightC) is equal to 32 and split_qt_flag is equal to 1
  (cbWidth/SubWidthC)*(cbHeight/SubHeightC) is equal to 16 and split_qt_flag is equal to 1
  (cbWidth/SubWidthC)*(cbHeight/SubHeightC) is equal to 16 and MttSplitMode[x0][y0][mttDepth] is equal to SPLIT_TT_HOR or SPLIT_TT_VER
  (cbWidth/SubWidthC)*(cbHeight/SubHeightC) is equal to 8 and MttSplitMode[x0][y0][mttDepth] is equal to SPLIT_BT_HOR or SPLIT_BT_VER
Otherwise, if one of the following conditions is true, modeTypeCondition is set equal to 1+(slice type!=I?1:0)
  (cbWidth/SubWidthC)*(cbHeight/SubHeightC) is equal to 16 and MttSplitMode[x0][y0][mttDepth] is equal to SPLIT_BT_HOR or SPLIT_BT_VER
  (cbWidth/SubWidthC)*(cbHeight/SubHeightC) is equal to 32 and MttSplitMode[x0][y0][mttDepth] is equal to SPLIT_TT_HOR or SPLIT_TT_VER
Otherwise, modeTypeCondition is set equal to 0

In the text above, chroma_format_idc=0 refers to a monochrome chroma format; chroma_format_idc=1 refers to a 4:2:0 chroma format; chroma_format_idc=2 refers to a 4:2:2 chroma format; and chroma_format_idc=3 refers to a 4:4:4 chroma format.

In some examples, video encoder 200 and video decoder 300 may be configured to determine the SCIPU using the chroma block size and luma block size. An SCIPU may be an intra coded area, an intra SCIPU area or a non-inter area, where all the blocks within the SCIPU are intra coded. An SCIPU may additionally or alternatively be an inter SCIPU, where all the blocks within the SCIPU are inter coded. In VVC Draft 6, an inter block cannot be smaller than 4×4. Therefore, for the smallest block in the current SCIPU, the block cannot be an inter one, and be inferred as an intra one.

In some examples, video encoder 200 and video decoder 300 may be configured to use the split of luma area, the size of smallest luma block, and the size of the smallest chroma block of a partition to determine whether the block is an SCIPU and whether the block is an inter or non-inter SCIPU or whether the block is an inter or intra SCIPU, with an intra SCIPU being considered as an example of non-inter in some examples. In one example, if the size of the smallest luma block and the size of the smallest chroma block of a partition is smaller than a threshold (TH), it (e.g., the smallest chroma block or the smallest luma block) is considered as an SCIPU. Otherwise, it (e.g., the smallest chroma block or the smallest luma block) is not an SCIPU. In also this example, if it (e.g., the smallest chroma block or the smallest luma block) is decided to be an SCIPU and the SCIPU is in an intra slice or the size of the smallest luma block in the area is smaller than the minimal size enabled for an inter block, the SCIPU is implicitly an intra SCIPU or the SCIPU is implicitly a non-inter SCIPU (intra SCIPU may be considered as an example of non-inter in some examples). Otherwise, it (e.g., the smallest chroma block or the smallest luma block) can be an intra or inter SCIPU or can be a non-inter or inter SCIPU.

The derivation of modeTypeCondition in VVC Draft 6 may be modified as follows:

7.4.9.4 Coding Tree Semantics

A variable min_luma_blk_size is derived as follows:
If qtbtt_dual_tree_intra_flag is equal to 1 or MttSplitMode[x0][y0][mttDepth] is equal to SPLIT_TT_HOR or SPLIT_TT_VER, min_luma_blk_size=(cbWidth*cbHeight)/4
Otherwise, if MttSplitMode[x0][y0][mttDepth] is equal to SPLIT_BT_HOR or SPLIT_BT_VER, min_luma_blk_size=(cbWidth*cbHeight)/2
Otherwise, min_luma_blk_size=(cbWidth*cbHeight)

A variable min_chroma_blk_size is derived as follows:
  min_chroma_blk_size=min_luma_blk_size/(SubWidthC*SubHeightC)

The variable modeTypeCondition is derived as follows:
If one of the following conditions is true, modeTypeCondition is set equal to 0
  slice_type==I and qtbtt_dual_tree_intra_flag is equal to 1
  modeTypeCurr is not equal to MODE_TYPE_ALL
  chroma_format_idc==0
  chroma_format_idc==3
  min_chroma_blk_size>=16
Otherwise, if min_luma_blk_size<=16, modeTypeCondition is set equal to 1
Otherwise, modeTypeCondition is set equal to 1+(slice type!=I?1:0).

In some examples, video encoder 200 and video decoder 300 may be configured to prevent or remove narrow vertical intra blocks (e.g., 2×N). In some examples, a split that results in 2×N may be prohibited in separate trees, e.g., dual tree structures or local dual tree structures. In an example, if the block width is equal to 8, the ternary tree (TT) split may be disabled. In also another example, if the block width is equal to 4, the vertical split may be disabled. In some examples, in single tree, the intra mode is disabled for 4×N luma blocks.

In some examples of using a single tree, video encoder 200 and video decoder 300 may be configured to apply the SCIPU with an extension. For instance, if the chroma width is 8 and the split of the luma component is the ternary tree (TT), this area (e.g., chroma width of 8) may be considered as an SCIPU. As another example, if the chroma width is 4 and the split of the luma area is vertical, this area (e.g., chroma width of 4) may be considered as an SCIPU.

In some examples, video encoder 200 and video decoder 300 may be configured to avoid the combination intra-inter prediction mode (CIIP) for 4×N blocks. That is, the CII may be disabled for 4×N blocks. In some examples, when the CIIP mode is applied for 4×N blocks, the combination prediction (e.g., using a combination of intra and inter-prediction) may be applied for only the luma component while the chroma components may be predicted using only one of intra or inter prediction (e.g., using only inter prediction). A CIIP block may be present in an inter slice and use a shared tree.

In some examples, video encoder 200 and video decoder 300 may be configured to adaptively split the chroma area of an intra SCIPU. As one example, the example techniques may enable splitting of the chroma area in an intra SCIPU. The example techniques may enable splitting of the chroma area in a non-inter SCIPU (intra SCIPU may be considered as an example of non-inter in some examples). In some examples, a split that leads to the smallest sub-block size satisfying the block size restriction may be allowed. For example, if the chroma area of the intra SCIPU is 8×N, the vertical split may be allowed. In some examples, if N=4, the horizontal split may be allowed. In some examples, if N=8, quad-tree split, vertical split, and horizontal split may be allowed. In some examples, if N>8, vertical split, horizontal split and TT horizontal split may be allowed.

In some examples, if the chroma area of the intra SCIPU is 4×8, the horizontal BT (binary tree) split may be allowed. In another example, if the chroma area of the intra SCIPU is 4×N, the horizontal BT split may be allowed. In another example, if the chroma area of the intra SCIPU is 4×N (N>8), the horizontal split including BT horizontal split and TT (ternary tree) horizontal split may be allowed.

In some examples, the split candidates of the chroma area in an intra SCIPU may depend on the split of the corresponding luma block. As one example, chroma split is disallowed if luma is not split. As one example, the chroma split direction cannot be orthogonal to the luma split direction. In one example, the horizontal split may be disallowed for the chroma intra SCIPU if the split of the luma block is vertical. In one example, the vertical split may be disallowed for the chroma intra SCIPU if the split of the luma block is horizontal.

This disclosure also describes examples of SCIPU signaling. In one example adaptation of SCIPU in VVC Draft 6, a flag is signaled to indicate whether an SCIPU is an inter-SCIPU or an intra-SCIPU. The signaling utilizes a new syntax, and the new syntax is different from prediction mode. This disclosure describes examples of alternatives for signaling of the SCIPU.

In a first aspect, the signaling of SCIPU may not be needed and the type of SCIPU may be derived from the signaling of the prediction mode of the first block in the SCIPU. In this example, no extra signaling syntax may be needed. The derivation of the SCIPU type may be as follows. As one example, if the first block of the SCIPU is inter, the SCIPU is implicitly considered as inter and the prediction mode of all blocks in the SCIPU is inter. As another example, when IBC (intra-block copy) is disabled, if the mode of the first block is intra, the SCIPU is implicitly considered as non-inter and the mode of the rest of the blocks is implicitly signaled (e.g., implicitly determined) as intra. As another example, when IBC is enabled, if the mode of the first block is intra or IBC, the SCIPU is implicitly considered as non-inter and the mode of the rest of the blocks is explicitly signaled as intra or IBC.

In a second aspect, the type (intra or inter) of SCIPUs may be explicitly signaled with the following examples. As one example, the signaling of the SCIPU flag may share the context of the context of signaling prediction mode of a block. For example, the context used to encode or decode the SCIPU flag may be the same context used to encode or decode information of a prediction mode of a block. In this example, the derivation of the context index is identical with the derivation of context index in the regular prediction mode coding. For example, the derivation techniques that video encoder 200 and video decoder 300 use to derive a context index for the context used to encode or decode the SCIPU flag may be the same derivation techniques that video encoder 200 and video decoder 300 use to derive a context index for the context use to encode and decode information indicative of the prediction mode of the block.

In some examples of the second aspect, the signaling of the SCIPU may be identical to signaling of the mode of the first block in the SCIPU. The SCIPU type of the SCIPU may be derived using the same techniques as described above with respect to the first aspect. However, there may be some differences with the first aspect. For example, in the first aspect, a check may be needed to identify whether a block is the first block in the SCIPU. In some examples of the second aspect, a check to identify whether a block is the first block in the SCIPU may not be needed.

In some examples of the second aspect, the SCIPU flag may be used to indicate whether the SCIPU is an inter SCIPU, an intra SCIPU, or an IBC SCIPU, in which the prediction mode of all blocks in the SCIPU is the same with the type of the SCIPU. For instance, although SCIPU flag is described, in some examples, a syntax element having a plurality of bits may be used to indicate whether the SCIPU is an inter SCIPU, an intra SCIPU, or an IBC SCIPU. In some examples, the prediction mode of all blocks in the SCIPU may be the same as the type of the SCIPU for all of an inter SCIPU, an intra SCIPU, and an IBC SCIPU. In some examples, the prediction mode of all blocks in the SCIPU may be the same as the type of the SCIPU for one or more, but not necessarily all, of an inter SCIPU, an intra SCIPU, and an IBC SCIPU.

In some examples, the SCIPU flag may be removed (e.g., not signaled), and the prediction mode of all luma blocks in the SCIPU area may be signaled. In such examples, the SCIPU type of the SCIPU may be determined (e.g., by video encoder 200 or video decoder 300) based on the prediction mode of one or more (e.g., any) of the blocks in the SCIPU area. In video encoder 200, an encoder constraint may be imposed such that an inter block may not (e.g., cannot) be mixed with an intra or IBC block in an SCIPU area. For instance, in an SCIPU area, if one block is coded using inter-prediction, then in some examples, none of the other blocks in the SCIPU area may be intra-predicted or predicted in IBC mode.

Figure 15:
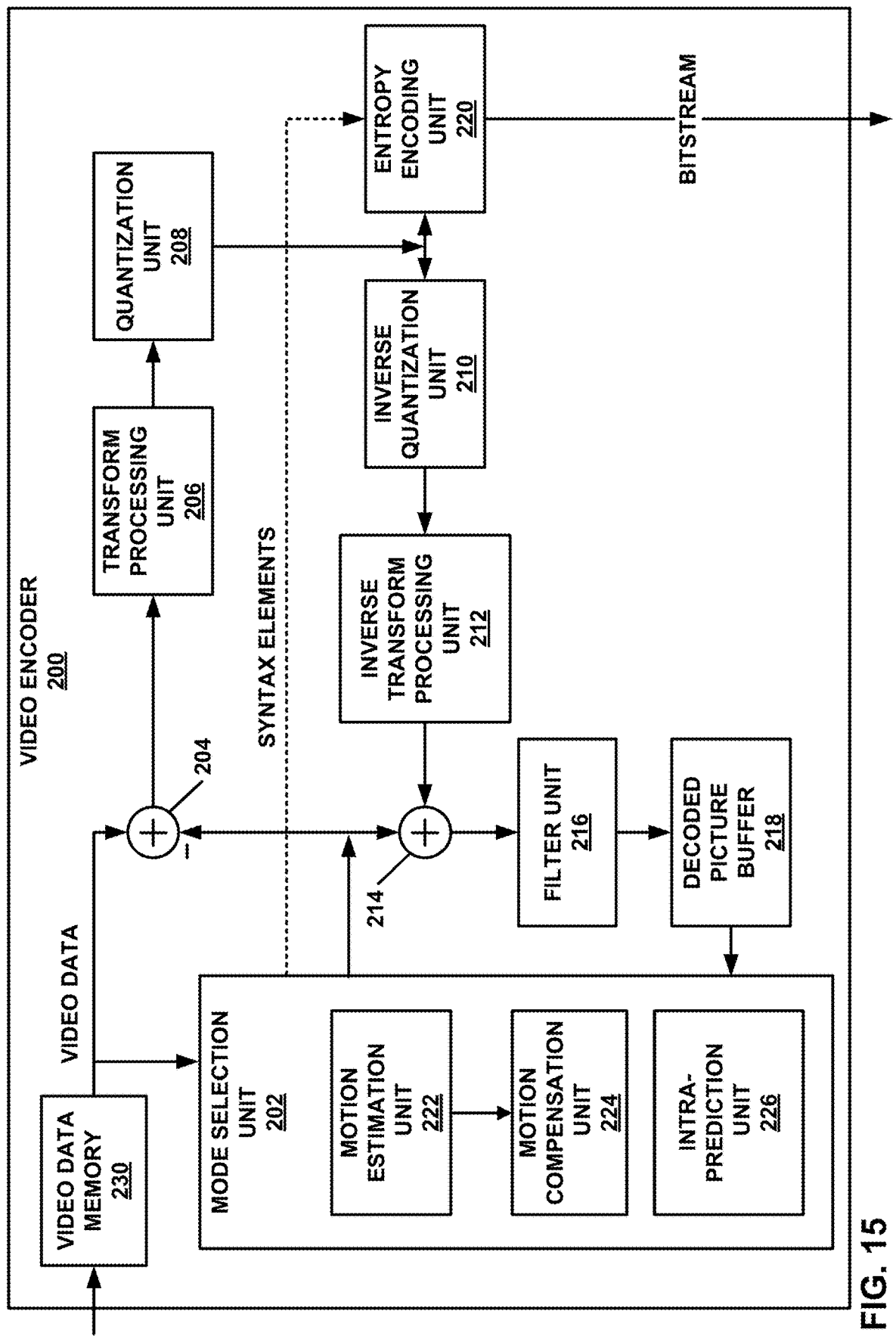
FIG. 15 is a block diagram illustrating an example video encoder that may perform the techniques of this disclosure.

FIG. 15 is a block diagram illustrating an example video encoder 200 that may perform the techniques of this disclosure. FIG. 15 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 15, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 15 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block. When encoding blocks, intra-prediction unit 226 may enable and disable an SCIPU based on a chroma subsampling format of the video data as described in this disclosure.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma CB of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma CB and corresponding chroma CBs. As above, the size of a CU may refer to the size of the luma CB of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma CB and/or chroma CBs. As described above, in some examples, the luma CB and chroma CBs are luma and chroma components of a CU. In some examples, the luma CB and the chroma CBs are luma and chroma components of a PU.

In some examples, operations performed with respect to a luma CB need not be repeated for the chroma CBs. As one example, operations to identify a motion vector (MV) and reference picture for a luma CB need not be repeated for identifying a MV and reference picture for the chroma blocks. Rather, the MV for the luma CB may be scaled to determine the MV for the chroma blocks, and the reference picture may be the same. As another example, the intra-prediction process may be the same for the luma CB and the chroma CBs.

Video encoder 200 represents an example of a device configured to encode video data including a memory configured to store video data, and one or more processing units implemented in circuitry and configured to perform any one or combination of examples described in this disclosure.

In one example, video encoder 200 may determine that applying a luma partition to a chroma area within a chroma component that corresponds to the luma partition results in chroma blocks having a size smaller than a threshold, determine an SCIPU based on the chroma area (e.g., SCIPU is equal to the chroma area), and encode the video data based on the determination of the SCIPU. As one example, video encoder 200 may determine a manner in which to split the chroma area based on the determination of the SCIPU and encode chroma blocks based on the determination of the manner which to split the chroma area.

In one example, video encoder 200 may determine that the video data is formatted in accordance with a 4:4:4 video coding format, determine that an SCIPU is disabled for the video data having the 4:4:4 video coding format, and encode the video data having the 4:4:4 video coding format based on the determination that SCIPU is disabled. In one example, video encoder 200 may determine that the video data is formatted in accordance with monochrome sampling, determine that an SCIPU is disabled for the video data having the monochrome sampling, and encode the video data having the monochrome sampling based on the determination that SCIPU is disabled.

In one example, video encoder 200 may encode the video data in a manner such that splitting of at least one of luma or chroma components does not result in at least one of 2×N sized luma or chroma blocks. In one example, video encoder 200 may encode the video data in a manner such that intra mode is disabled for 4×N luma blocks where a single tree is used to partition the luma and chroma components.

In one example, video encoder 200 may determine that a chroma width for a chroma block is 8, determine that a split of a luma component is ternary tree, determine an SCIPU based on the chroma block (e.g., SCIPU is equal to the chroma block), and encode the video data based on the determination of the SCIPU. For example, video encoder 200 may determine a manner in which to split a chroma component based on the determination of the SCIPU and encode chroma blocks based on the determination of the manner in which to split the chroma area.

In one example, video encoder 200 may determine that a chroma width for a chroma block is 4, determine that a split of a luma component is vertical, determine an SCIPU based on the chroma block (e.g., SCIPU is equal to the chroma block), and encode the video data based on the determination of the SCIPU. For example, video encoder 200 may determine a manner in which to split a chroma component based on the determination of the SCIPU and encode chroma blocks based on the determination of the manner in which to split the chroma area.

In one example, video encoder 200 may determine that splitting of a chroma area in a chroma component is enabled in an intra SCIPU and encode the chroma area based on the determination. In one example, video encoder 200 may determine a split of luma block, determine split candidates for chroma area in an intra SCIPU corresponding to the luma block, and encode the chroma area and the luma block based on the determined split of the luma block and the split candidates for the chroma area. In one example, video encoder 200 may determine one or more of a split of a luma area, size of smallest luma block, and size of smallest chroma block of a partition, at least one of determine whether a chroma block is an SCIPU or whether the chroma block is an inter or intra SCIPU, and code the chroma block based on the determination of at least one of whether the chroma block is the SCIPU or whether the chroma block is the inter or intra SCIPU.

Figure 16:
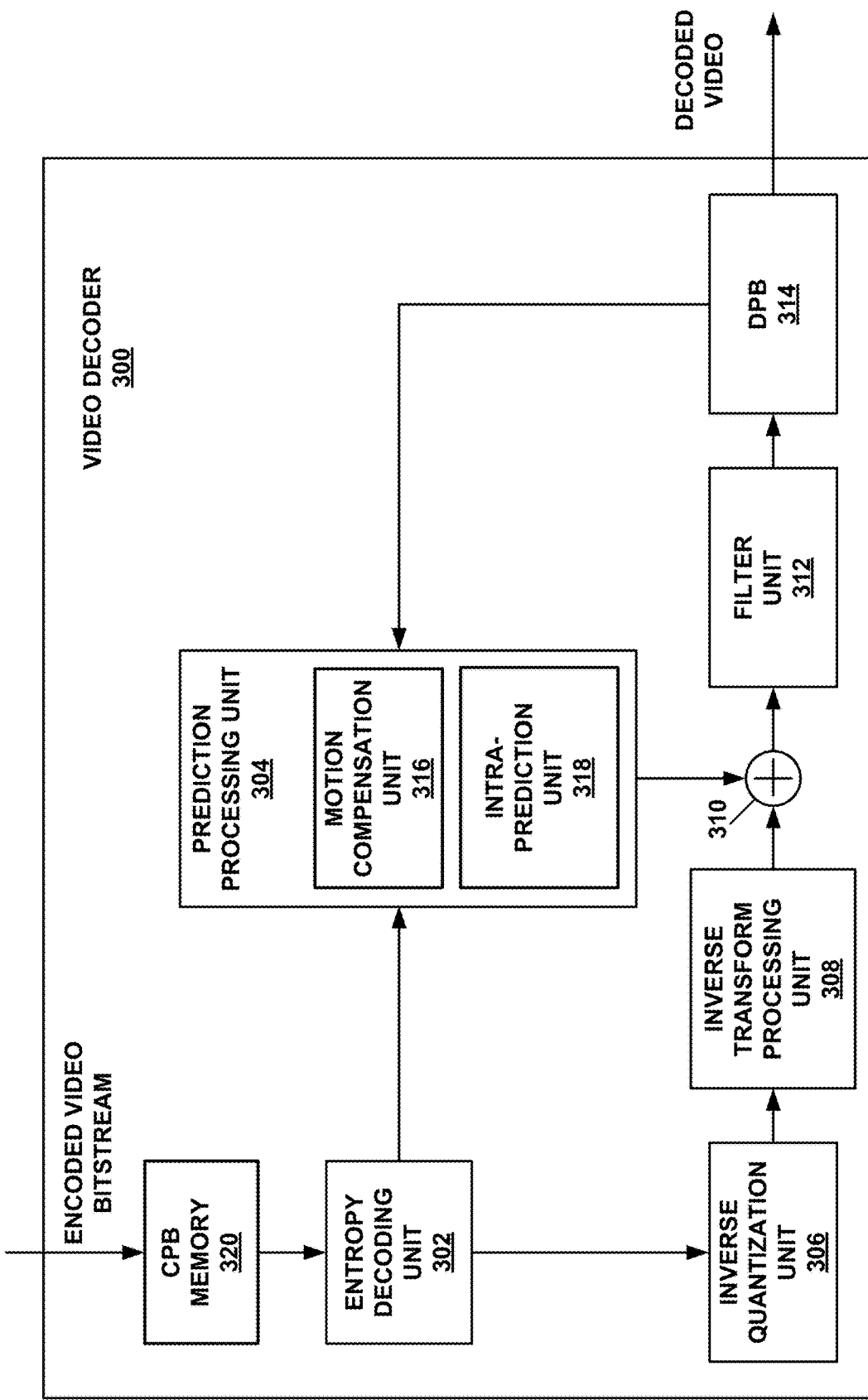
FIG. 16 is a block diagram illustrating an example video decoder that may perform the techniques of this disclosure.

FIG. 16 is a block diagram illustrating an example video decoder 300 that may perform the techniques of this disclosure. FIG. 16 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 16, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 16 are illustrated to assist with understanding the operations performed by video decoder 300. The units may be implemented as fixed-function circuits, programmable circuits, or a combination thereof. Similar to FIG. 15, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 15).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 15). Intra-prediction unit 318 may retrieve data of neighboring samples to the current block from DPB 314. When decoding blocks, intra-prediction unit 318 may enable and disable an SCIPU based on a chroma subsampling format of the video data as described in this disclosure.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a device configured to decode video data including a memory configured to store video data, and one or more processing units implemented in circuitry and configured to perform any one or combination of examples described in this disclosure.

In one example, video decoder 300 may determine that applying a luma partition to a chroma area within a chroma component that corresponds to the luma partition results in chroma blocks having a size smaller than a threshold, determine an SCIPU based on the chroma area (e.g., SCIPU is equal to the chroma area), and decode the video data based on the determination of the SCIPU. As one example, video decoder 300 may determine a manner in which to split the chroma area based on the determination of the SCIPU and decode chroma blocks based on the determination of the manner which to split the chroma area.

In one example, video decoder 300 may determine that the video data is formatted in accordance with a 4:4:4 video coding format, determine that an SCIPU is disabled for the video data having the 4:4:4 video coding format, and decode the video data having the 4:4:4 video coding format based on the determination that SCIPU is disabled. In one example, video decoder 300 may determine that the video data is formatted in accordance with monochrome sampling, determine that an SCIPU is disabled for the video data having the monochrome sampling, and decode the video data having the monochrome sampling based on the determination that SCIPU is disabled.

In one example, video decoder 300 may decode the video data in a manner such that splitting of at least one of luma or chroma components does not result in at least one of 2×N sized luma or chroma blocks. In one example, video decoder 300 may decode the video data in a manner such that intra mode is disabled for 4×N luma blocks where a single tree is used to partition the luma and chroma components.

In one example, video decoder 300 may determine that a chroma width for a chroma block is 8, determine that a split of a luma component is ternary tree, determine an SCIPU based on the chroma block (e.g., SCIPU is equal to the chroma block), and decode the video data based on the determination of the SCIPU. For example, video decoder 300 may determine a manner in which to split a chroma area (e.g., samples of a chroma component) based on the determination of the SCIPU and decode chroma blocks based on the determination of the manner in which to split the chroma area.

In one example, video decoder 300 may determine that a chroma width for a chroma block is 4, determine that a split of a luma component is vertical, determine an SCIPU based on the chroma block (e.g., SCIPU is equal to the chroma block), and decode the video data based on the determination of the SCIPU. For example, video decoder 300 may determine a manner in which to split a chroma component based on the determination of the SCIPU and decode chroma blocks based on the determination of the manner in which to split the chroma area.

In one example, video decoder 300 may determine that splitting of a chroma area in a chroma component is enabled in an intra SCIPU and decode the chroma area based on the determination. In one example, video decoder 300 may determine a split of a luma block, determine split candidates for a chroma area in an intra SCIPU corresponding to the luma block, and decode the chroma area and the luma block based on the determined split of the luma block and the split candidates for the chroma area. In one example, video decoder 300 may determine one or more of a split of a luma area, size of smallest luma block, and size of smallest chroma block of a partition, at least one of determine whether a chroma block is an SCIPU or whether the chroma block is an inter or intra SCIPU, and code the chroma block based on the determination of at least one of whether the chroma block is the SCIPU or whether the chroma block is the inter or intra SCIPU.

Figure 17:
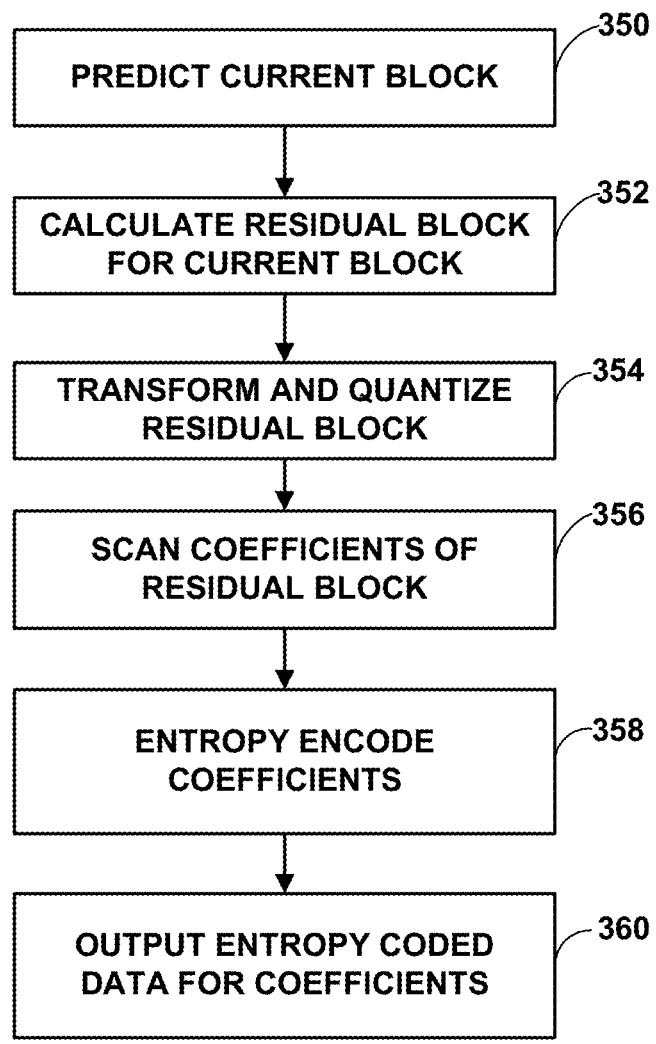
FIG. 17 is a flowchart illustrating an example method for encoding a current block.

FIG. 17 is a flowchart illustrating an example method for encoding a current block. The current block may comprise a current CU. Although described with respect to video encoder 200 (FIGS. 1 and 14), it should be understood that other devices may be configured to perform a method similar to that of FIG. 17.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 18:
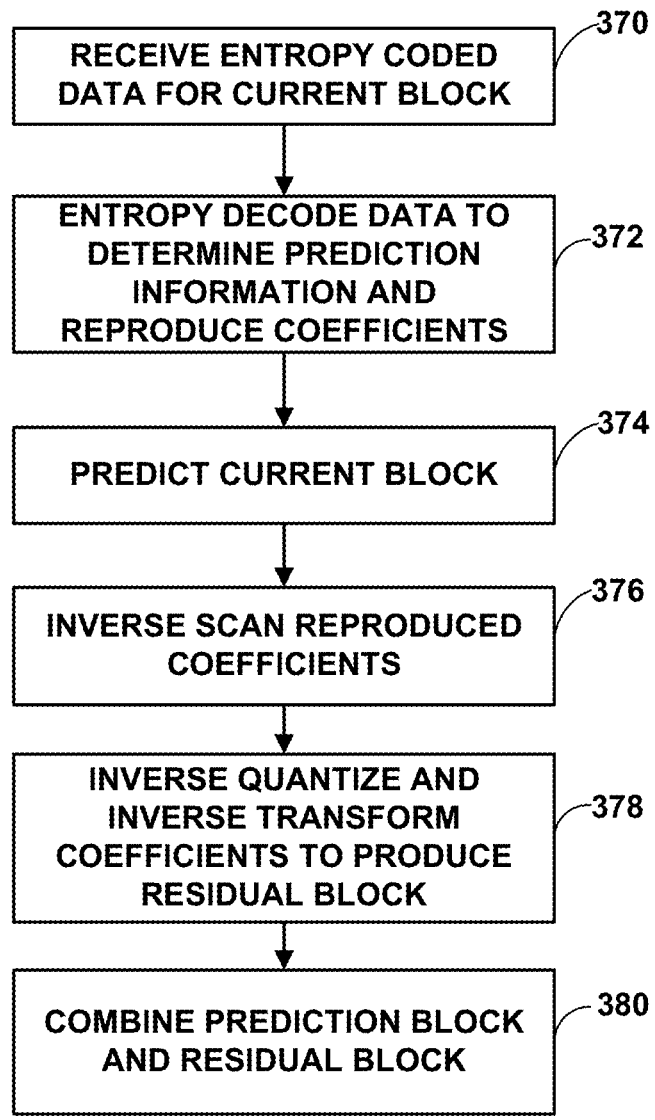
FIG. 18 is a flowchart illustrating an example method for decoding a current block.

FIG. 18 is a flowchart illustrating an example method for decoding a current block of video data. The current block may comprise a current CU. Although described with respect to video decoder 300 (FIGS. 1 and 15), it should be understood that other devices may be configured to perform a method similar to that of FIG. 18.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 19:
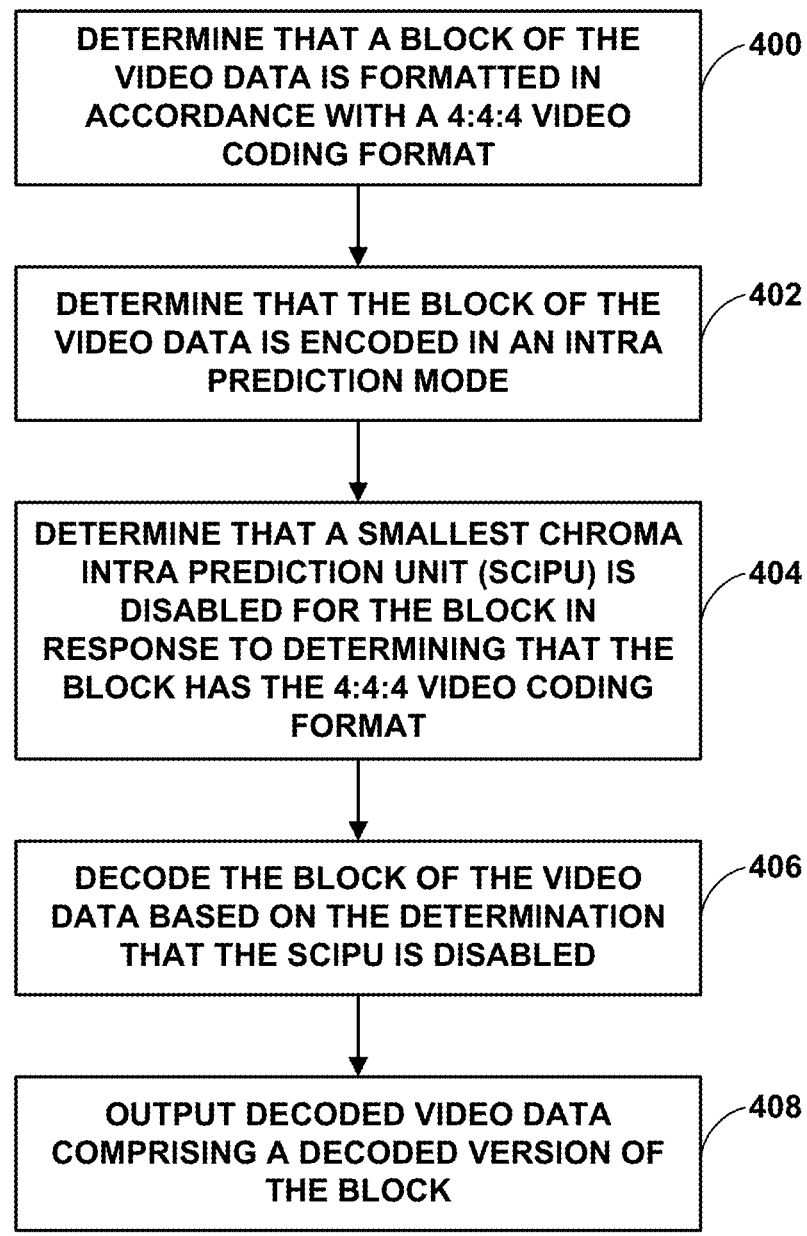
FIG. 19 is a flowchart illustrating an example method for decoding a current block.

FIG. 19 is a flowchart illustrating an example method for decoding a current block of video data. The current block may comprise a current CU. Although described with respect to video decoder 300 (FIGS. 1 and 15), it should be understood that other devices may be configured to perform a method similar to that of FIG. 19.

Video decoder 300 determines that a block of the video data is formatted in accordance with a 4:4:4 video coding format (400). As the block is coded in the 4:4:4 video coding format, a luma component, a first chroma component, and a second chroma component of the block may all have a same size, meaning the chroma components are not sub-sampled relative to the luma component. The block of video data may, for example, be a CTU. The luma component of the block may be a luma CTB the CTU; the first chroma component of the block may be a first chroma CTB of the CTU; and the second chroma component of the block may be a second chroma CTB of the CTU.

Video decoder 300 determines that the block of the video data is encoded in an intra prediction mode (402). The block of the video data, even though encoded in the intra prediction mode, may be included in an inter coded slice, as inter coded slices can include both intra and inter coded blocks.

Video decoder 300 determines that SCIPU is disabled for the block in response to determining that the block has the 4:4:4 video coding format (404). Video decoder 300 may, for example, determine that the block is in the 4:4:4 video coding format based on syntax signaled at a slice level or other higher level syntax data. In response to determining that the SCIPU is disabled for the block, video decoder 300 may, for example, determine that the luma component, the first chroma component, and the second chroma component have a same partitioning structure. In that same partitioning structure, the first chroma component and the second chroma component may be smaller than 16 samples. The first chroma component and the second chroma component may also have a vertical narrow shape, meaning the first chroma component and the second chroma component may be smaller than 16 samples and be greater in height than in width.

Video decoder 300 decodes the block of the video data based on the determination that the SCIPU is disabled (406). To decode the block of the video data based on the determination that the SCIPU is disabled, video decoder 300 may, for example, determine that a first chroma component of the block and a second chroma component of the block both have a same size as a luma component of the block, and intra predict a luma component of the block, intra predict a first chroma component of the block, and intra predict a second chroma component of the block.

Video decoder 300 outputs decoded video data that includes a decoded version of the block (408). Video decoder 300 may, for example, output the decoded video data for display or storage. Video decoder 300 may, for example, store the video data for transmission, future display, or for use in decoding other blocks of video data. In some example, the techniques described with respect to FIG. 19 may be performed by the video decoding loop of a video encoder, in which case the decoded video data that is output may be used for determining how to encode other blocks of video data.

In one example, video decoder 300 also determines that a second block of the video data is formatted in accordance with a non-4:4:4 video coding format; determines that the second block of the video data is encoded in an intra prediction mode; determines that the SCIPU is enabled for the block in response to determining that the block has the non-4:4:4 video coding format; decodes the second block of the video data based on the determination that the SCIPU is enabled; and outputs decoded video data that includes a decoded version of the second block. A luma component of the second block may have a different size than a first chroma component of the second block and a second chroma component of the second block. In response to determining that the SCIPU is enabled for the second block, video decoder 300 may determine that the luma component of the second block, the first chroma component of the second block, and the second chroma component of the second block have a different partitioning structure.

To decode the second block of the video data based on the determination that the SCIPU is enabled comprises, video decoder 300 may intra predicting a luma component of the second block, intra predict a first chroma component of the second block, and intra predict a second chroma component of the second block. The luma component of the second block may have a size of 4×N, where 4 is a width of the luma component of the second block and N is a height of the of the luma component of the second block. As a result of SCIPU being enabled, however, the first chroma component of the second block may have a width greater than or equal to 4, and the second chroma component of the second block may have a width greater than or equal to 4, even though the second block is coded in a non-4:4:4 format.

One or more examples are described below. The example techniques may be used alone or in combination.

Example 1. A method of coding video data, the method comprising: determining that applying a luma partition to a chroma area within a chroma component that corresponds to the luma partition results in chroma blocks having a size smaller than a threshold; determining a smallest chroma intra prediction unit (SCIPU) based on the chroma area; and coding the video data based on the determination of the SCIPU.

Example 2. A method of coding video data, the method comprising: determining that the video data is formatted in accordance with a 4:4:4 video coding format; determining that a smallest chroma intra prediction unit (SCIPU) is disabled for the video data having the 4:4:4 video coding format; and coding the video data having the 4:4:4 video coding format based on the determination that the SCIPU is disabled.

Example 3. A method of coding video data, the method comprising: determining that the video data is formatted in accordance with monochrome sampling; determining that a smallest chroma intra prediction unit (SCIPU) is disabled for the video data having the monochrome sampling; and coding the video data having the monochrome sampling based on the determination that the SCIPU is disabled.

Example 4. A method of coding video data, the method comprising any one or combination of examples 1-3.

Example 5. A method of coding video data, the method comprising: coding the video data in a manner such that splitting of at least one of luma or chroma components does not result in at least one of 2×N sized luma or 2×N sized chroma blocks.

Example 6. The method of example 5, wherein coding the video data comprises coding the video data in the manner such that splitting of at least one of luma or chroma components does not result in at least one of 2×N sized luma or 2×N chroma blocks where separate coding trees are used to partition the luma and chroma components.

Example 7. The method of any of examples 5 and 6, wherein coding the video data comprises determining that ternary tree (TT) split is disabled based on the block width being equal to 8.

Example 8. The method of any of examples 5-7, wherein coding the video data comprises determining that vertical split is disabled based on the block width being equal to 4.

Example 9. A method of coding video data, the method comprising: coding the video data in a manner such that intra mode is disabled for 4×N luma blocks where a single tree is used to partition the luma and chroma components.

Example 10. A method of coding video data, the method comprising: determining that a chroma width for a chroma block is 8; determining that a split of a luma component is ternary tree; determining a smallest chroma intra prediction unit (SCIPU) based on the chroma block; and coding the video data based on the determination of the SCIPU.

Example 11. A method of coding video data, the method comprising: determining that a chroma width for a chroma block is 4; determining that a split of a luma component is vertical; determining a smallest chroma intra prediction unit (SCIPU) based on the chroma block; and coding the video data based on the determination of the SCIPU.

Example 12. A method of coding video data, the method comprising: determining that splitting of a chroma area in a chroma component is enabled in an intra smallest chroma intra prediction unit (SCIPU); and coding the chroma area based on the determination.

Example 13. The method of example 12, wherein determining that splitting of the chroma area in the chroma component is enabled comprises performing a split that leads to the smallest subblock size satisfying a block size restriction.

Example 14. The method of example 13, wherein performing the split comprises performing a vertical split when a chroma area of the intra SCIPU is 8×N.

Example 15. The method of any of examples 13 and 14, wherein performing the split comprises performing a horizontal split when a chroma area of the intra SCIPU is 8×4.

Example 16. The method of any of examples 13-15, wherein performing the split comprises performing at least one of a vertical split, horizontal split, or a ternary tree horizontal split when a chroma area of the intra SCIPU is 8×N and N is greater than 8.

Example 17. The method of any of examples 12-16, wherein determining that splitting of the chroma area in the chroma component is enabled comprises determining that horizontal binary tree split is enabled when a chroma area of the intra SCIPU is 4×8.

Example 18. The method of any of examples 12-17, wherein determining that splitting of the chroma area in the chroma component is enabled comprises determining that horizontal binary tree split is enabled when a chroma area of the intra SCIPU is 4×N.

Example 19. The method of any of examples 12-17, wherein determining that splitting of the chroma area in the chroma component is enabled comprises determining that horizontal split including binary tree horizontal split and ternary tree horizontal split is enabled when a chroma area of the intra SCIPU is 4×N and N is greater than 8.

Example 20. A method of coding video data, the method comprising: determining a split of luma block; determining split candidates for a chroma area in an intra smallest chroma intra prediction unit (SCIPU) corresponding to the luma block; and coding the chroma area and the luma block based on the determined split of the luma block and the split candidates for the chroma area.

Example 21. The method of example 20, wherein determining split candidates comprises determining that chroma split is disallowed based on a luma block not being split.

Example 22. The method of any of examples 20 and 21, wherein determining split candidates comprises determining that chroma split cannot be orthogonal to a luma split direction.

Example 23. The method of example 22, wherein determining that chroma split cannot be orthogonal to luma split direction comprises: determining that horizontal split is disallowed for the chroma intra SCIPU based on the split of the luma block being vertical; or determining that vertical split is disallowed for the chroma intra SCIPU based on the split of the luma block being horizontal.

Example 24. A method of coding video data, the method comprising: determining one or more of a split of a luma area, size of smallest luma block, and size of smallest chroma block of a partition; at least one of determining whether a chroma block is a smallest chroma intra prediction unit (SCIPU) and whether the chroma block is an inter or intra SCIPU based on the determination; and coding the chroma block based on the determination of at least one of whether the chroma block is the SCIPU or whether the chroma block is the inter or intra SCIPU.

Example 25. The method of example 24, wherein determining whether the chroma block is the SCIPU comprises determining that the chroma block is the SCIPU based on the size of the smallest luma block and the size of the smallest chroma block of the partition being smaller than a threshold.

Example 26. The method of any of examples 24 and 25, for the chroma block that is the SCIPU, based on the SCIPU being in an intra slice or the size of the smallest luma block in the area being smaller than a minimum size enabled for an inter block, determining that the chroma block is the intra SCIPU.

Example 27. The method of any one or combination of examples 1-26.

Example 28. The method of any one or combination of examples 1-26, wherein coding comprises decoding, and wherein decoding comprises reconstructing the video data.

Example 29. The method of any one or combination of examples 1-26, wherein coding comprises encoding, and wherein encoding comprises signaling the video data.

Example 30. A device for coding video data, the device comprising: memory configured to store video data; and a video coder coupled to the memory and comprising at least one of fixed-function or programmable circuitry, wherein the video coder is configured to perform the method of any one or combination of examples 1-26.

Example 31. The device of example 30, wherein the video coder comprises a video decoder, and wherein the video decoder is configured to reconstruct the video data.

Example 32. The device of example 30, wherein the video coder comprises a video encoder, and wherein the video encoder is configured to signal the video data.

Example 33. The device of any of examples 30-32, further comprising a display configured to display decoded video data.

Example 34. The device of any of examples 30-33, wherein the device comprises one or more of a camera, a computer, a mobile device, a broadcast receiver device, or a set-top box.

Example 35. A computer-readable storage medium having stored thereon instructions that, when executed, cause one or more processors to perform the method of any one or combination of examples 1-26.

Example 36. A device for coding video data, the device comprising means for performing the method of any one or combination of examples 1-26.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a block of the video data is formatted in accordance with a 4:4:4 video coding format;
   determining that the block of the video data is encoded in an intra prediction mode;
   determining that a smallest chroma prediction unit is disabled for the block in response to determining that the block has the 4:4:4 video coding format and determining that the block of the video data is encoded in the intra prediction mode;
   decoding the block of the video data using sizes of chroma prediction units smaller than the smallest chroma prediction unit; and
   outputting decoded video data comprising a decoded version of the block.

2. The method of claim 1, wherein the block has a luma component, a first chroma component, and a second chroma component, and wherein the luma component, the first chroma component, and the second chroma component have a same size.

3. The method of claim 2, wherein the same size is less than 16 samples.

4. The method of claim 2, further comprising:
   in response to determining that the smallest chroma prediction unit is disabled for the block, determining that the luma component, the first chroma component, and the second chroma component have a same partitioning structure.

5. The method of claim 1, wherein the block of the video data that is encoded in the intra prediction mode is included in an inter coded slice.

6. The method of claim 1, wherein decoding the block of the video data based on the determination that the smallest chroma prediction unit is disabled comprises:
   intra predicting a luma component of the block;
   intra predicting a first chroma component of the block; and
   intra predicting a second chroma component of the block, wherein the first chroma component of the block and the second chroma component of the block both have a same size as the luma component of the block.

7. The method of claim 6, wherein the block of video data comprises a coding tree unit (CTU), the luma component of the block comprises a luma coding unit of the CTU, the first chroma component of the block comprises a first chroma coding unit of the CTU, and the second chroma component of the block comprises a second chroma coding unit of the CTU.

8. The method of claim 7, wherein the first chroma coding unit and the second coding chroma coding unit are smaller than 4×4.

9. The method of claim 1, further comprising:
   determining that a second block of the video data is formatted in accordance with a non-4:4:4 video coding format;

determining that the second block of the video data is encoded in an intra prediction mode;

determining that the smallest chroma prediction unit is enabled for second the block in response to determining that the second block has the non-4:4:4 video coding format;

decoding the second block of the video data without using sizes of chroma prediction units smaller than the smallest chroma prediction unit; and outputting decoded video data comprising a decoded version of the second block.

10. The method of claim 9, wherein a luma component of the second block has a different size than a first chroma component of the second block and a second chroma component of the second block.

11. The method of claim 9, further comprising:

in response to determining that the smallest chroma prediction unit is enabled for the second block, determining that the first chroma component of the second block and the second chroma component of the second block have a different partitioning structure than the luma component of the second block.

12. The method of claim 9, wherein decoding the second block of the video data based on the determination that the smallest chroma prediction unit is enabled comprises:

intra predicting a luma component of the second block;

intra predicting a first chroma component of the second block; and intra predicting a second chroma component of the second block, wherein the luma component of the second block has a size of 4×N, wherein 4 is a width of the luma component of the second block and N is a height of the of the luma component of the second block, and wherein the first chroma component of the second block has a width greater than or equal to 4 and the second chroma component of the second block has a width greater than or equal to 4.

13. The method of claim 12, wherein N is equal to 2.

14. The method of claim 1, wherein the method of decoding is performed as part of a video encoding operation.

15. A device for decoding video data, the device comprising:

a memory configured to store video data;

one or more processors implemented in circuitry and configured to:

determine that a block of the video data is formatted in accordance with a 4:4:4 video coding format;

determine that the block of the video data is encoded in an intra prediction mode;

determine that a smallest chroma prediction unit is disabled for the block in response to determining that the block has the 4:4:4 video coding format and determining that the block of the video data is encoded in the intra prediction mode;

decode the block of the video data using sizes of chroma prediction units smaller than the smallest chroma prediction unit; and output decoded video data comprising a decoded version of the block.

16. The device of claim 15, wherein the block has a luma component, a first chroma component, and a second chroma component, and wherein the luma component, the first chroma component, and the second chroma component have a same size.

17. The device of claim 16, wherein the same size is less than 16 samples.

18. The device of claim 16, wherein the one or more processors are further configured to:

in response to determining that the smallest chroma prediction unit is disabled for the block, determine that the luma component, the first chroma component, and the second chroma component have a same partitioning structure.

19. The device of claim 15, wherein the block of the video data that is encoded in the intra prediction mode is included in an inter coded slice.

20. The device of claim 15, wherein to decode the block of the video data based on the determination that the smallest chroma prediction unit is disabled, the one or more processors are further configured to:

intra predict a luma component of the block;

intra predict a first chroma component of the block; and intra predict a second chroma component of the block, wherein the first chroma component of the block and the second chroma component of the block both have a same size as the luma component of the block.

21. The device of claim 20, wherein the block of video data comprises a coding tree unit (CTU), the luma component of the block comprises a luma coding unit of the CTU, the first chroma component of the block comprises a first chroma coding unit of the CTU, and the second chroma component of the block comprises a second chroma coding unit of the CTU.

22. The device of claim 21, wherein the first chroma coding unit and the second coding chroma coding unit are smaller than 4×4.

23. The device of claim 15, wherein the one or more processors are further configured to:

determine that a block of the video data is formatted in accordance with a 4:4:4 video coding format;

determine that the block of the video data is encoded in an intra prediction mode;

determine that a smallest chroma prediction unit is disabled for the block in response to determining that the block has the 4:4:4 video coding format and determining that the block of the video data is encoded in the intra prediction mode;

decode the second block of the video data without using sizes of chroma prediction units smaller than the smallest chroma prediction unit; and output decoded video data comprising a decoded version of the block.

24. The device of claim 23, wherein a luma component of the second block has a different size than a first chroma component of the second block and a second chroma component of the second block.

25. The device of claim 23, wherein the one or more processors are further configured to:

in response to determining that the smallest chroma prediction unit is enabled for the second block, determine that the first chroma component of the second block and the second chroma component of the second block have a different partitioning structure than the luma component of the second block.

26. The device of claim 23, wherein to decode the second block of the video data based on the determination that the smallest chroma prediction unit is enabled, the one or more processors are further configured to:

intra predict a luma component of the second block;

intra predict a first chroma component of the second block; and intra predict a second chroma component of the second block, wherein the luma component of the second block has a size of 4×N, wherein 4 is a width of the luma component of the second block and N is a height of the of the luma component of the second block, and wherein the first chroma component of the second block has a width greater than or equal to 4 and the second chroma component of the second block has a width greater than or equal to 4.

27. The device of claim 26, wherein N is equal to 2.

28. The device of claim 15, wherein the device is configured to decode the video data as part of a video encoding operation.

29. The device of claim 15, wherein the device comprises a wireless communication device, further comprising a receiver configured to receive encoded video data.

30. The device of claim 29, wherein the wireless communication device comprises a telephone handset and wherein the receiver is configured to demodulate, according to a wireless communication standard, a signal comprising the video data.

31. The device of claim 15, further comprising:
a display configured to display decoded video data.

32. The device of claim 15, wherein the device comprises one or more of a camera, a computer, a mobile device, a broadcast receiver device, or a set-top box.

33. A non-transitory computer-readable storage medium storing instructions that when executed by one or more processors cause the one or more processor to:
determine that a block of the video data is formatted in accordance with a 4:4:4 video coding format;
determine that the block of the video data is encoded in an intra prediction mode;
determine that a smallest chroma prediction unit is disabled for the block in response to determining that the block has the 4:4:4 video coding format and determining that the block of the video data is encoded in the intra prediction mode;
decode the block of the video data using sizes of chroma prediction units smaller than the smallest chroma prediction unit; and
output decoded video data comprising a decoded version of the block.

34. An apparatus for decoding video data, the apparatus comprising:
means for determining that a block of the video data is formatted in accordance with a 4:4:4 video coding format;
means for determining that the block of the video data is encoded in an intra prediction mode;
means for determining that a smallest chroma prediction unit is disabled for the block in response to determining that the block has the 4:4:4 video coding format and determining that the block of the video data is encoded in the intra prediction mode;
means for decoding the block of the video data using sizes of chroma prediction units smaller than the smallest chroma prediction unit; and
means for outputting decoded video data comprising a decoded version of the block.

35. A device for decoding video data, the device comprising:
a memory configured to store video data;
one or more processors implemented in circuitry and configured to:
determine that a first block of the video data is formatted in accordance with a 4:4:4 video coding format;
determine that the first block of the video data is encoded in an intra prediction mode;
determine that a smallest chroma prediction unit is disabled for the first block in response to determining that the first block has the 4:4:4 video coding format and determining that the block of the video data is encoded in the intra prediction mode;
decode the first block of the video data using sizes of chroma prediction units smaller than the smallest chroma prediction unit, wherein to decode the first block, the one or more processors are configured to;
intra predict a luma component of the first block;
intra predict a first chroma component of the first block; and
intra predict a second chroma component of the first block, wherein the first chroma component of the first block and the second chroma component of the first block both have a same size as the luma component of the first block, and wherein the same size is less than 16 samples;
determine that a second block of the video data is formatted in accordance with a non-4:4:4 video coding format;
determine that the second block of the video data is encoded in an intra prediction mode;
determine that the smallest chroma prediction unit is enabled for the second block in response to determining that the second block has the non-4:4:4 video coding format;
decode the second block of the video data without using sizes of chroma prediction units smaller than the smallest chroma prediction unit, wherein to decode the second block, the one or more processors are configured to;
intra predict a luma component of the second block;
intra predict a first chroma component of the second block; and
intra predict a second chroma component of the second block, wherein the first chroma component of the second block and the second chroma component of the second block both have a different size than the luma component of the second block; and
output decoded video data comprising a decoded version of the first block and decoded version of the second block.

36. The method of claim 1, further comprising:
determining that a second block of the video data is formatted in accordance with a monochrome video coding format;
determining that the second block of the video data is encoded in a second intra prediction mode;
determining that the smallest chroma prediction unit is disabled for the second block in response to determining that the block has the monochrome video coding format;
decoding the second block of the video data based on the determination that the smallest chroma prediction unit is disabled; and
wherein the outputted video data comprises a decoded version of the second block.

37. The method of claim 1, further comprising:
determining that a second block of the video data is formatted in accordance with a non-4:4:4 video coding format, wherein the second block of the video data comprises a coding tree unit (CTU);
determining a minimum chroma block size for chroma coding units of the CTU;
determining that the smallest chroma prediction unit is disabled for the second block in response to determining that the minimum chroma block size is greater than or equal to a threshold value; and wherein the outputted video data comprises a decoded version of the second block.

38. The method of claim 9, wherein the second block of video data comprises a coding tree unit (CTU), the method further comprising:
   determining a minimum luma block size for luma coding units of the CTU;
   determining that the smallest chroma prediction unit is enabled for the second block further in response to determining that the minimum luma block size is less than a threshold value; and
   wherein the outputted video data comprises a decoded version of the second block.

39. The device of claim 15, wherein the one or more processors are further configured to:
   determine that a second block of the video data is formatted in accordance with a monochrome video coding format;
   determine that the second block of the video data is encoded in a second intra prediction mode;
   determine that the smallest chroma prediction unit is disabled for the second block in response to determining that the block has the monochrome video coding format;
   decode the second block of the video data based on the determination that the smallest chroma prediction unit is disabled; and
   wherein the outputted video data comprises a decoded version of the second block.

40. The device of claim 15, wherein the one or more processors are further configured to:
   determine that a second block of the video data is formatted in accordance with a non-4:4:4 video coding format, wherein the second block of the video data comprises a coding tree unit (CTU);
   determine a minimum chroma block size for chroma coding units of the CTU;
   determine that the smallest chroma prediction unit is disabled for the second block in response to determining that the minimum chroma block size is greater than or equal to a threshold value; and
   wherein the outputted video data comprises a decoded version of the second block.

41. The device of claim 23, wherein the second block of video data comprises a coding tree unit (CTU), and wherein the one or more processors are further configured to:
   determine a minimum luma block size for luma coding units of the CTU;
   determine that the smallest chroma prediction unit is enabled for the second block further in response to determining that the minimum luma block size is less than a threshold value; and
   wherein the outputted video data comprises a decoded version of the second block.

42. A device for decoding video data, the device comprising:
   a memory configured to store video data;
   one or more processors implemented in circuitry and configured to:
      determine that a first block of the video data is formatted in accordance with a 4:2:0 video coding format;
      determine that the first block of the video data is encoded in a first intra prediction mode;
      determine that a smallest chroma prediction unit is enabled for the first block in response to determining that the first block has the 4:2:0 video coding format and determining that the first block of the video data is encoded in the first intra prediction mode;
      decode the first block of the video data without using sizes of chroma prediction units smaller than the smallest chroma prediction unit;
      determine that a second block of the video data is formatted in accordance with a 4:4:4 video coding forma and determining that the second block of the video data is encoded in the second intra prediction mode;
      determine that the second block of the video data is encoded in a second intra prediction mode;
      determine that the smallest chroma prediction unit is disabled for the second block in response to determining that the second block has the 4:4:4 video coding format;
      decode the second block of the video data using sizes of chroma prediction units smaller than the smallest chroma prediction unit; and
      output decoded video data comprising a decoded version of the first block and a decoded version of the second block.

* * * * *